US007409428B1

(12) United States Patent
Brabec et al.

(10) Patent No.: US 7,409,428 B1
(45) Date of Patent: Aug. 5, 2008

(54) SYSTEMS AND METHODS FOR MESSAGING TO MULTIPLE GATEWAYS

(75) Inventors: Frantisek Brabec, North Potomac, MD (US); David R. Drescher, Arlington, VA (US); Daniel A. Gadra, Arlington, VA (US); Daniel D. Park, Arlington, VA (US); Richard A. Tiene, Arlington, VA (US)

(73) Assignee: Cooper Technologies Company, Houston, TX (US)

( * ) Notice: Subject to any disclaimer, the term of this patent is extended or adjusted under 35 U.S.C. 154(b) by 794 days.

(21) Appl. No.: 10/829,181

(22) Filed: Apr. 22, 2004

Related U.S. Application Data

(60) Provisional application No. 60/514,873, filed on Oct. 29, 2003, provisional application No. 60/320,133, filed on Apr. 22, 2003.

(51) Int. Cl.
*G06F 15/16* (2006.01)
(52) U.S. Cl. .................. 709/206; 709/205; 709/207; 709/230; 709/246; 709/248
(58) Field of Classification Search ............ 709/205, 709/206, 207, 230, 246, 248
See application file for complete search history.

(56) References Cited

U.S. PATENT DOCUMENTS

| | | | | |
|---|---|---|---|---|
| 5,493,692 | A * | 2/1996 | Theimer et al. | 455/26.1 |
| 5,946,386 | A * | 8/1999 | Rogers et al. | 379/265.09 |
| 6,507,589 | B1 * | 1/2003 | Ramasubramani et al. | 370/465 |
| 6,785,379 | B1 * | 8/2004 | Rogers et al. | 379/265.02 |
| 6,829,478 | B1 | 12/2004 | Layton et al. | 455/428 |
| 6,907,416 | B2 | 6/2005 | Tasooji et al. | 705/50 |
| 6,909,903 | B2 | 6/2005 | Wang | 455/456.1 |
| 6,938,076 | B2 * | 8/2005 | Meyer et al. | 709/219 |
| 6,970,909 | B2 * | 11/2005 | Schulzrinne | 709/206 |
| 7,058,710 | B2 | 6/2006 | McCall et al. | 709/224 |
| 7,062,535 | B1 | 6/2006 | Stark et al. | 709/206 |
| 7,233,781 | B2 | 6/2007 | Hunter et al. | 455/404.1 |
| 7,254,614 | B2 * | 8/2007 | Mulligan et al. | 709/207 |
| 7,277,018 | B2 | 10/2007 | Reyes et al. | 340/573.1 |
| 2001/0032232 | A1 * | 10/2001 | Zombek et al. | 709/201 |
| 2001/0047391 | A1 * | 11/2001 | Szutu | 709/206 |
| 2002/0091944 | A1 * | 7/2002 | Anderson et al. | 713/201 |
| 2003/0018726 | A1 * | 1/2003 | Low et al. | 709/206 |
| 2003/0023695 | A1 * | 1/2003 | Kobata et al. | 709/206 |
| 2003/0050986 | A1 * | 3/2003 | Matthews et al. | 709/206 |
| 2003/0069002 | A1 | 4/2003 | Hunter et al. | 455/404 |
| 2003/0110097 | A1 | 6/2003 | Lei et al. | |

(Continued)

OTHER PUBLICATIONS

National Information Technology Center, "The Computer Emergency Notification System (CENS) Application," Sep. 23, 2003, www.ocio.usda.gov/nitc/products/cens.html.

(Continued)

*Primary Examiner*—Michael Won
(74) *Attorney, Agent, or Firm*—King & Spadling

(57) ABSTRACT

Systems and methods for providing message communication among multiple communication gateways. In particular, systems and methods for providing non-voice message delivery to intended recipients with increased speed and reliability to multiple users on multiple platforms. The systems and methods relate to non-voice messaging to multiple messaging gateways. In at least one embodiment, the systems and methods include Internet based electronic messaging using a messaging subsystem configured to optimize text message delivery to communication gateways.

18 Claims, 22 Drawing Sheets

U.S. PATENT DOCUMENTS

| | | |
|---|---|---|
| 2003/0135575 A1 | 7/2003 | Mareika et al. ............. 709/207 |
| 2003/0158891 A1 | 8/2003 | Lei et al. |
| 2004/0008125 A1 | 1/2004 | Aratow et al. .......... 340/870.07 |
| 2005/0159973 A1 | 7/2005 | Krause et al. .................. 705/1 |
| 2005/0162267 A1 | 7/2005 | Khandelwal et al. ........ 340/506 |
| 2006/0168185 A1 | 7/2006 | McCale et al. .............. 709/223 |

OTHER PUBLICATIONS

Roaming Messenger, Inc., "Breakthrough Solution for Mobile Messaging," www.roamingmessenger.com/, 2003.

Roaming Messenger, Inc., "overview," www.roamingmessenger.com/Technology, 2003.

Roaming Messenger, Inc., "architecture," www.roamingmessenger.com/Technology/architecture.php, 2003.

Roaming Messenger, Inc., "core technology," www.roamingmessenger.com/Technology/coretech.php, 2003.

Roaming Messenger, Inc., "patent info," www.roamingmessenger.com/Technology/patent-info.php, 2003.

* cited by examiner

Roam Alert
Secure Network >>Groups>>Memberships

Group "Demo" Memberships

Get help for this page ->  [?]

Add Custom Group Members to Demo
Remove Custom Group Members from Demo

Custom group: 0 members

Non-members: 2431 — 401

| | | |
|---|---|---|
| "Hot | "Nextel | Twoway.5712387900@... |
| "Hot | "Nextel | Twoway.5712387901@... |
| 11-03 | Rick's new cricks@contacts | |
| Abrams | Stephen | abrams@police.psu.e |
| Adams | David | amesde@state.gov |
| Agens | Dave | dagens@berriencounty |
| Agnew | Scott | scott.agnew@cingular |
| Aiken | Christopher | Christopher.Aiken@... |
| Albright | Helen | halbright@camdencou |
| Alcorta | Richard | ralcorta@mdems.uma |
| Alessi | Carmen | Twoway.5712388161@ |
| Allen | Kenneth | kballen@ppw.us |
| Allen | Tanya | tanya_allen@kcmo.org |
| Allport | Doug | doug.allport@Allpc |
| Ambrose | Anthony | ambrosea@ci.newa |
| Amin | Massoud | amin@umn.edu |

[First 1] [2] [3] [4] [Last5]  [1] Next

Members: 3

| | | |
|---|---|---|
| Drescher | David | davidd@roamsecure.net |
| Le Hoch | Patrick | patricklf@roamsecure.ne |
| Park | Daniel | danp@roamsecure.net |

[Add >>]

[<< Remove]

[1]
[Last 1]

Name search [        ]
Group search [All]     [Search] Matching results: 2431

Name search [        ]  [Search]

[Search]  [e] HELP                                        ⊛ Internet

Roam Alert
Secure Network >> Multiserver Roam Secure Alert Network >> Remote Groups    Get help for this page -> [?]

From here, you can establish and maintain remote groups (groups of users hosted on other Roam Secure Alert Network™ servers). You can negotiate partnerships with other Roam Secure Alert Network™ participants to exchange alerts between your Roam Secure Alert Network™ systems. Please click on "?" for more information.

Add/Edit Remote Groups

- 501 — Group Name
- 502 — Short Group Name
- 503 — Group Code
- 504 — Remote Server: dcema ▼

[Add] [Cancel]

Remote Groups

| Group Name | Short Group Name | Group Code | Remote Server | Edit authorization |
|---|---|---|---|---|
| DC Bomb Techs | DC Bomb Techs | DCBT | dcema | Edit |
| DPTest | DPTest | dp | test | Edit |
| fandatest | fandatest | fts | test | Edit |
| GTown RS remote test | GTown RS remote test | rs | gtrshost | Edit |

LOGS & REPORTS                                                              Internet

*FIG. 5*

Roam Alert
Secure Network >>Alert Tracker

Search      Get help for this page ->  [?]

| Alert | # | | Category | Any ▼ | Groups | | Sent After | | | Clear Dates |
| --- | --- | --- | --- | --- | --- | --- | --- | --- | --- | --- |
| Quick Alert | All ▼ | | | | Content | | Sent Before | | | Search |

☐ Auto Refresh                Alerts - 159 alert(s) displayed

| | | | | | Recipients | | | Response |
| --- | --- | --- | --- | --- | --- | --- | --- | --- |
| Alert # | Date | Time | Category | Sender | Content | Groups | To # | Confirmed |
| 440 | 04/07/04 | 12:10:23 | | Le Floch, P | This is a test of RSAN | Contact Roam Secure | ✉ 7 | 3 |
| 439 | 04/02/04 | 15:07:37 | | <deleted> | TEST of Bounces from Yahoo | Patrick Test 4/2 | ✉ 1 | 0 |
| 438 | 03/30/04 | 16:04:50 | | Le Floch, P | test4 | Patrick Le Floch, p p, p | ✉ 3 | 0 |
| 437 | 03/26/04 | 09:32:20 | | Drescher, D | This is a sample Emergency Action Me | TASC Demo | ✉📱 5 | 6 |
| 436 | 03/24/04 | 15:39:12 | | Le Floch, P | -VEMA LOOKS AT READINESS FOR AN | RS PLF VIPs | ✉ 53 | 0 |
| 435 | 03/24/04 | 15:23:02 | | Gadra, D | -VEMA LOOKS AT READINESS FOR AN | RS VIPs | ✉ 390 | 0 |
| 434 | 03/24/04 | 15:16:56 | | Gadra, D | -VEMA LOOKS AT READINESS FOR AN | Dan Test | ✉ 4 | 0 |
| 433 | 03/24/04 | 14:45:11 | | Gadra, D | -VEMA LOOKS AT READINESS FOR AN | Dan Test | ✉ 4 | 0 |
| 432 | 03/24/04 | 14:40:51 | | Le Floch, P | -VEMA looks at readiness for another | Patrick Le Floch | ✉ 1 | 0 |
| 431 | 03/24/04 | 14:36:14 | | Gadra, D | -VEMA looks at readiness for another | Dan Test | ✉ 4 | 0 |
| 430 | 03/24/04 | 14:20:42 | | Drescher, D | Test message to see formatting of big | DP test | ✉ 3 | 0 |
| 429 | 03/19/04 | 12:33:31 | | Park, D | This is test #1 of the Emergency Aler | Dan Test 3 | ✉📱 4 | 0 |
| 428 | 03/19/04 | 12:24:52 | | Park, D | This is test #1 of the Emergency Aler | Dan Test 3 | ✉📱 1 | 0 |

🅴 LOGS & REPORTS                        ⊗ Internet

Roam Secure Alert Network Registration note: by registering you agree to our Terms of Service

801 — Name [First] [Last]
E-mail address [ ]  If you do not have an e-mail address, click here and you will be assigned a substitute username. Please remember this username.

Mobile Device / Additional E-mail Address to Receive alerts
If you do not have a mobile device, skip this section and alerts will be sent to your e-mail address entered above. You can always add your mobile devices later.

802 — Select your cell phone/mobile device carrier
Select one... [ ]  Enter your cell phone number (10 digits, e.g. 2025555555 no dashes or spaces, no "1" prefix required) or mobile device
Select one... [ ]  e-mail address (e.g., johns@archwireless.net)
Select one... [ ]

Account Password

803 — Create a password for your Roam Secure Alert Network account [ ]
Confirm password [ ]

Please complete the information below

Do you work for TASC?  [Not selected / Yes / No]

ALERT SAMPLE evacuate the West Office Building immediately. Use the stairs and go to the rear parking lot until further notice.

NEW USER
LOGIN
LEARN MORE
FAQ'S
SUPPORT http://alert.roamsecure.net/tos.php

Delivery Channels

| Delivery Channel Name | Character Limit Per Message | Delivery Method | Automatic Prefix | Automatic Suffix | Class | Comment |
|---|---|---|---|---|---|---|
| Arch Wireless | 960 | email_pager | | @archwireless.net | pagers | |
| AT&T | 120 | email_cell | | @mobile.att.net | cell phones | |
| BlackBerry Aether | 16000 | email_pager | | @myaetherbb.com | pagers | |
| BlackBerry Cingular | No limit with attachments | email_pager | | @imcingular.com | pagers | |
| BlackBerry GoAmerica | 16000 | email_pager | | @goamerica.net | pagers | |
| BlackBerry T-Mobile | 16000 | email_pager | | @tmo.blackberry.net | pagers | |
| BlackBerry Verizon | 120 | email_cell | | @vtext.com | cell phones | |
| Cingular | 121 | email_cell | | @mobile.mycingular.com | cell phones | |
| E-mail account | No limit with attachments | email | | | E-mail accounts | |
| Metrocall | 235 | email_pager | | @page.metrocall.com | pagers | |
| Metrocall 2-way | 400 | email_pager | | @my2way.com | pagers | |
| Mobile Message | 460 | email_pager | | @mobilemessage.com | pagers | |
| my2way.com | 460 | email_pager | | @my2way.com | pagers | |
| Nextel | 260 | email_cell | | @messaging.nextel.com | cell phones | |
| Nextel w/2way msging | 460 | email_cell | | @messaging.nextel.com | cell phones | |
| Other carrier | 110 | email_cell | | | cell phones | |
| Other cell carrier | 120 | email_cell | | | cell phones | |
| Pagenet/Arch | 460 | email_pager | | @archwireless.net | pagers | |
| PEPCO | 250 | email_pager | | @pepco.com | pagers | |
| Rinkers | 220 | email_pager | | @epage.rinkers.com | pagers | |
| Sender PopUp | 2000 | popup | | | | |
| Skytel | 960 | email_pager | | @skytel.com | E-mail accounts | |
| Sprint | 140 | email_cell | | @messaging.sprintpcs.com | cell phones | |
| T-Mobile | 120 | email_cell | | @tmomail.net | cell phones | |
| Verizon | 120 | email_cell | | @vtext.com | cell phones | |
| Voicestream | 120 | email_cell | | @voicestream.net | cell phones | |
| WebLink | 460 | email_pager | | @airmessage.net | pagers | |

*FIG. 17*

SYSTEMS AND METHODS FOR MESSAGING TO MULTIPLE GATEWAYS

This application claims the benefit of U.S. Provisional Application No. 60/320,133, filed Apr. 22, 2003, and U.S. Provisional Application No. 60/514,873, filed Oct. 29, 2003.

This disclosure contains information subject to copyright protection. The copyright owner has no objection to the facsimile reproduction by anyone of the patent disclosure or the patent as it appears in the U.S. Patent and Trademark Office files or records, but otherwise reserves all copyright rights whatsoever.

BACKGROUND

1. Field of Invention

The present invention relates to the field of communications and, more specifically, to methods and systems for transmitting and receiving messages.

2. Description of Related Art

In today's world, information exchanges between people in many ways. In that regard, numerous types of communication systems exist for this purpose, including, for example, radio, television, cable, internet, two-way radio, cellular telephone systems, LANS, WANS, and optical communication systems. Advances in technology enable the distribution of information faster and more efficiently than was possible just several years ago. Some information is trivial, while other information can be critical and needs to travel immediately to the recipients.

In responding to emergency situations, the need for particular information relating to the emergency is sorely acute. Such emergency related information may include a threat of a disastrous event, terrorism induced threats and events, location and description of the event, evacuation instructions and status, and the status and coordination of the response to the threat or event. This information is invaluable to government and private agencies responsible for preventing, assessing, and responding to such events, and also by those on the front lines that are present at such an event and are dealing with it directly (e.g., "first responders" such as police, fire and rescue, emergency medical personnel). Fast and reliable dissemination of emergency information to emergency response personnel is necessary in order for the emergency to be contained and neutralized with minimal loss of life in terms of both emergency personnel and the general population.

Therefore, systems have been deployed to assist emergency personnel and responsible agencies in disseminating emergency alerting messages and notifications to emergency response personnel. However, such existing systems are notoriously slow and unreliable. Furthermore, many of these systems lack any practical confirmation mechanism from which the alert originator can ascertain whether or not a sufficient response team has been assembled or dispatched. For example, many agencies at all levels of government may employ a telephone based auto-dialer system in which emergency response personnel are contacted by telephone individually seriatim. Such systems may include, for example, a human dispatcher who simply begins contacting, one at a time, individual members of an emergency response team by dialing the emergency contact telephone number for each team member whose name appears on a predefined list corresponding to the type of threat or emergency. Alternatively, multiple operators may dial emergency personnel in parallel, or a computer-based auto-dialer may be used in which a voice message is played over the telephone to the answerer. Such systems and methods are plagued with limitations and inefficiencies, not the least of which is the slow speed at which a response team can be contacted and assembled, and provided with relevant information concerning the emergency. For example, telephone based auto-dialers typically contact emergency response personnel one-at-a-time, resulting in a slow notification process. Even in the case in which multiple dispatchers or auto-dialers are used, coordination problems may ensue in tracking which personnel have been reached and given positive confirmation of their response. For computer-assisted auto-dialers, the voice mail message played to an individual may not provide significant information specific to the emergency and, further, may not be customizable to include important information concerning the particular nature of the threat or event leading to the emergency situation.

Over and above all of these limitations, all voice-based existing systems and methods depend on the reliability and availability of the telephone service in providing emergency message notification. Unfortunately, both land line based and mobile telephone communication are vulnerable in times of emergency, in terms of both reliability and availability. Because telecommunication systems are designed to accommodate a statistical average number of voice users having a particular call duration (e.g., commonly modeled using the Erlang probability density function), voice circuits may become saturated or overloaded in an emergency situation in which many callers are attempting to connect using the voice carrying network. Wireless voice-based communications systems such as cellular telephone systems and their digital counterparts are also susceptible to overloading due to bandwidth limitations of and shared access to the radio channel. These situations occurred in certain metropolitan areas during the events of Sep. 11, 2001.

First responders may also use one or more radio-based systems for coordination and status of response activities, typically at the site of the emergency. Such radio systems may be simplex systems (i.e., one-way voice traffic only) and have a limited number of frequency channels for communications. In addition, different agencies and teams typically use different frequency channels, radios, and/or air interface technologies and modulation techniques (e.g, Single Side Band (SSB), Very High Frequency (VHF), spread spectrum). Thus, coordination among multiple government agencies responding to a large scale event is problematic, if possible at all. The current situation engenders at least confusion and inefficiency for those responding to emergencies and, of most concern, the potential for additional loss of human life.

Thus, there is a need for reliable and fast communication systems and methods that overcome these limitations of voice-based communications for disseminating alerts and notifications that may be, for example, associated with emergency prevention and response.

SUMMARY

The present invention is directed generally to providing systems and methods for communication among multiple communication gateways. Furthermore, embodiments may provide non-voice message delivery to intended recipients with increased speed and reliability. Embodiments may also provide efficient and user-friendly systems and methods for non-voice messaging to multiple users on multiple platforms. In particular, the advent of consumer wireless devices has provided a powerful, but underutilized, communication infrastructure. Many such devices may be included in an overall strategy to place vital information quickly and reliably to many recipients.

More specifically, the systems and methods may relate to non-voice messaging to multiple messaging gateways, and, in at least one embodiment, to messaging using channels configured for data or control traffic. Embodiments may also include a packet-based electronic messaging application that may include a process for optimizing text message delivery to electronic mail and SMS (or "text-messaging") gateways. For example, in an embodiment, methods and systems may be provided for Internet based electronic messaging to multiple messaging gateways. Embodiments may include an Internet based messaging application that incorporates a process for optimizing message delivery to electronic mail and Short Message Service (SMS), or "text-messaging" gateways. Embodiments may also include message delivery using pager systems. The systems and methods may be device and carrier agnostic and conform to industry Internet and wireless standards allowing it to work with existing carriers and equipment. Embodiments may provide reliable and fast alert delivery, simple web-browser based management, and a networking option for forming messaging coalitions for cross-jurisdictional message sharing that supports agency interoperability. Embodiments may also include easy interfacing with existing emergency-management infrastructure to provide flexible and improved message distribution within and across organizational boundaries.

Still further aspects included for various embodiments are apparent to one skilled in the art based on the study of the following disclosure and the accompanying drawings thereto.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and:

FIG. 4 is an example group membership interactive page according to at least one embodiment;

FIG. 5 is an example of a Graphical User Interface (GUI) interactive page for configuring remote user messaging groups according at least one embodiment;

FIG. 6 is an example of a GUI for an alert tracking interactive page according to at least one embodiment;

FIGS. 8a and 8b are an example of a GUI for a registration interactive page according to at least one embodiment;

FIG. 10 is an example of a GUI for a management console interactive page according to at least one embodiment, including one or more quick alert icons;

FIG. 17 is an example of a GUI for an interactive delivery channels page according to at least one embodiment;

DETAILED DESCRIPTION

The present invention is directed generally to providing systems and methods for non-voice based communication. For example, the methods and systems may relate to Internet based electronic messaging to multiple messaging gateways. In at least one embodiment, the systems and methods may include an Internet based messaging application having a process for optimizing text message delivery to one or more communication gateways such as, for example, electronic mail and SMS (or "text-messaging") gateways.

In particular, exemplary embodiments may include standards-based systems and methods that provide emergency communications to text message enabled appliances such as, but not limited to, wireless devices and other such e-mail addressable delivery points. Such embodiments thereby combine the inherent redundancy of communication networks such as, for example, the Internet with delivery to multiple devices per user to provide a high delivery success rate that persists even in the case of breakdowns within or overloading of public communication infrastructures.

Figure 1:
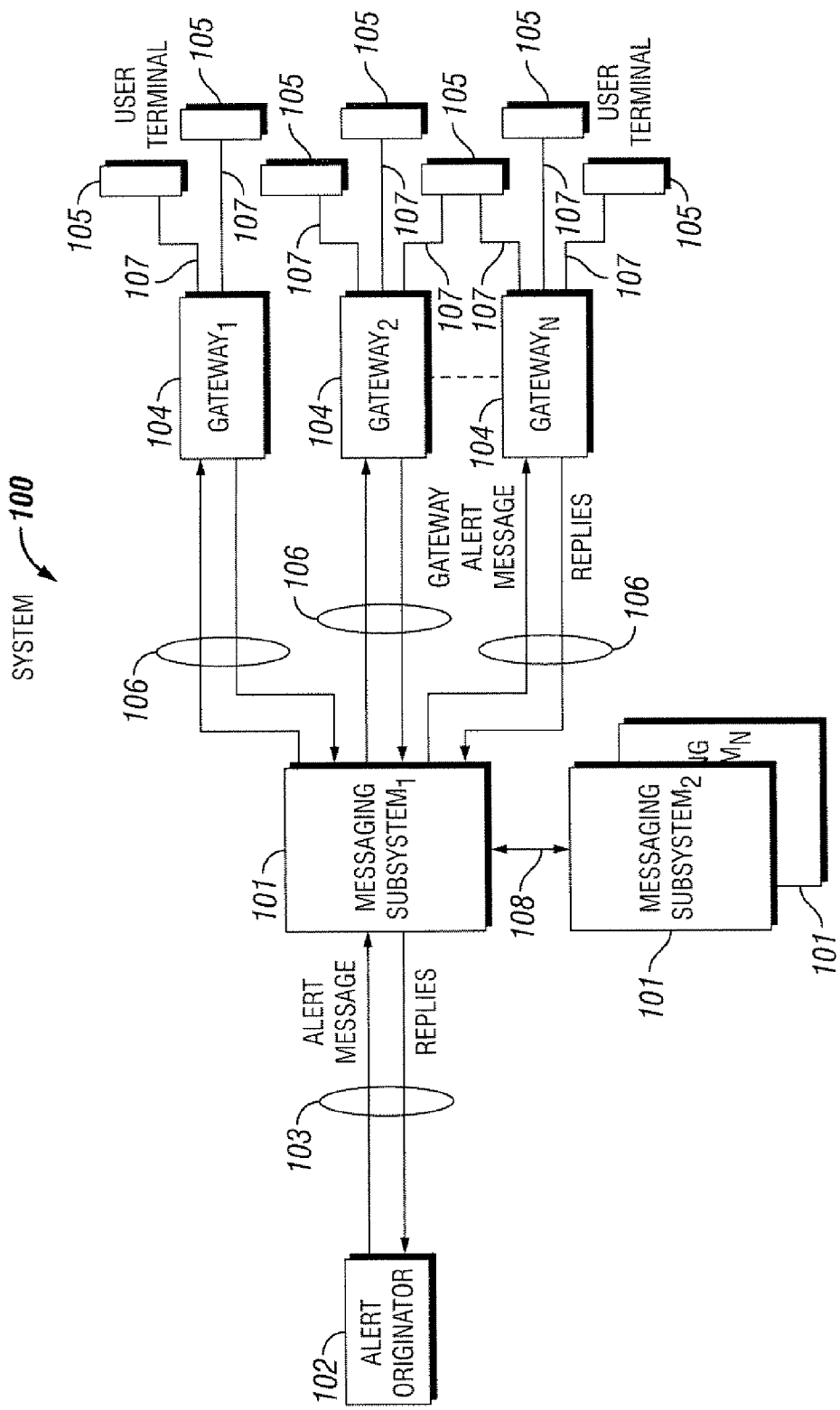
FIG. 1 is a top level system block diagram of a system according to at least one embodiment.

At least one embodiment of a communication system 100 according to the present invention may be as shown in FIG. 1. Referring to FIG. 1, the communication system 100 may include at least one messaging subsystem 101. The messaging subsystem 101 may be coupled to an alert originator 102 via a network 103 and one or more communication gateways 104 via a network 106. Each communication gateway 104 may be coupled to one or more user terminals 105 via a network 107. Further, in an embodiment, the system 100 may include more than one messaging subsystem 101 (e.g., up to "n" such subsystems as shown in FIG. 1). In such embodiments, one or more of the messaging subsystems 101 may be coupled to each other using a network 108.

The alert originator 102 may be a communications enabled terminal provided in communication with the messaging subsystem 101 via the network 103. For example, the alert originator 102 may be a personal computer having a network connection, such as a dial-up modem connection to a network. In such embodiments, the network 103 may be a packet-switched network such as, for example, the Internet. In some embodiments, the alert originator 102 may include an electronic mail application for receiving electronic mail messages in accordance with, for example, the Simple Mail Transfer Protocol (SMTP). Further, the alert originator 102 may include a web browser capable of transmitting and receiving and displaying information in accordance with the HyperText Transfer Protocol (HTTP) using the network 103. The alert originator 102 may send a first message, such as an alert message, to the messaging subsystem 101 via the network 103 in the form of an electronic message such as, for example, an SMTP electronic message, an HTML or XML message, or an SMS message from the wireless device. Further, in an embodiment the alert originator 102 may be a remote sensor or a sensor monitoring device or system that automatically generates a message to the messaging subsystem 101 in response to the occurrence of a conditional event (e.g., flood gates opened at a dam). In an embodiment, a message or alert generated by a remote alert originator 102 (including, for example, an automated process), the alert originator 102 may provide an identifier (e.g., for authentication), the intended target recipients of the message/alert, and the content of the message/alert. In an embodiment, the originator identification may be provided in the form of a Personal Identification Number (PIN) code. At least one embodiment, the messaging subsystem 101 may only provide messaging for authorized senders or alert originators 102.

In an embodiment, the communication gateway 104 may be an access point for a communication network 107 that provides communication services for a plurality of user terminals 105. For example, the communication network 107 may be a landline based network such as the Public Switched Telecommunications Network (PSTN). In an embodiment, the network 107 may be a wireless telecommunications network such as a cellular service provider or a Personal Communications Services (PCS) service provider. Such networks 107 may be, for example, but not limited to, based on the Global System for Mobile Communications (GSM), Code Division Multiple Access (CDMA) such as the system described in Interim Standard (IS)-95 for digital cellular radio systems, IS-54 dual mode analog and digital cellular telephone service, IS-54B digital Time Division Multiple Access (TDMA) cellular telephone service, IS-41 based Advanced Mobile Phone Service (AMPS, or "analog") telephone service, IS-136 Digital AMPS telephone service, or other standards-based telecommunication system, paging networks, Blackberry™ networks, or a variation or combination thereof.

The networks 107 may include a control channel, a channel for data traffic, or both, separate and distinct from the voice traffic bearing channel or channels. For example, the GSM series of standards includes a Short Message Service (SMS) channel useful for sending text based messages. Furthermore, telecommunications services providers commonly utilize out-of-band signaling, such as the signaling based on Signaling System No. 7 (SS7), in order to maximize the voice traffic capacity and availability of the bearer channel. Other telecommunications services standards include separate channels for slow signaling or for data-only traffic. In all such schemes, the data or control traffic may be routed and transferred throughout the network 107 using communication channels that are separate from voice traffic channels. Such arrangements may prevent data traffic from adversely impacting the voice traffic capacity of the network 107. The inventors of the present invention have discovered that this separation of data/control channels from voice traffic channels may have advantages for reliably and quickly transmitting and receiving text messages via the data or control channels in situations in which voice channels or circuits are overloaded, overutilized, or otherwise unavailable to a user. Thus, embodiments may allow messages to be delivered to first responders, coordinators, and other emergency response personnel reliably and quickly, preventing loss of life and property.

In at least one embodiment, the terminal 105 may be a cellular telephone, a Personal Digital Assistant (PDA), a Personal Computer (PC) such as a PC workstation, mobile PC or laptop PC, or a tablet PC, a Blackberry™ device, a pager, a Wi-Fi device, a Bluetooth™ enabled device, a radio receiver, or any other such wireless or wired terminal capable of receiving non-voice communications. In an embodiment, the terminal 105 may include a text message application for receiving and displaying non-voice messages using a display on the terminal 105 via the network 107. Alternatively, the terminal 105 may be coupled to a remote output device for output of a non-voice message for review by a user of the terminal 105. In some embodiments, the terminal 105 may include an electronic mail application for receiving electronic mail messages in accordance with, for example, the Post Office Protocol (POP/POP3).

Still further, the terminal 105 may include a web browser capable of transmitting and receiving and displaying information in accordance with the HyperText Transfer Protocol (HTTP) using the network 107. In at least one embodiment, the user terminal 105 may be, for example, a web-enabled personal computer provided with the capability to receive and display graphical user interfaces included on, for example, HyperText Markup Language (HTML) formatted or Extensible HyperText Markup Language (XML) formatted pages, private network (e.g., intranet) pages, etc., provided in accordance with, for example, HyperText Transport Protocol (HTTP) as well as the capability to transmit and receive electronic mail messages in accordance with Simple Mail Transport Protocol (SMTP). In at least one embodiment, the terminal 105 may be in general any device capable of receiving electronic mail ("email") or paging messages such as pagers, cell phones, PDAs, and the like. For pagers, the messaging subsystem 101 may support many different paging protocols such as, for example, but not limited to, Wireless Communication Transport Protocol (WCTP), Post Office Code Standardisation Advisory Group (POCSAG) (various baud rates), Flexible wide-area synchronous protocol (FLEX™), Golay sequential coding, Telocator Alphanumeric Protocol (TAP) (e.g., version 1.8), and COMP (COMP1 and COMP2). Furthermore, the messaging subsystem 101 may support delivery of messages to terminals 105 configured to accept and output instant messages. For example, the messaging subsystem 101 may support terminals 105 that use a popup message output such as the WiredRed instant messaging protocol using WiredRed Software of San Diego, Calif., or the Computer Emergency Notification System (CENS) used by, for example, the United States Department of Agriculture (USDA), further information regarding which is available from the USDA National Information Technology Center of Washington, D.C. Still further, the terminal 105 may be another device or system capable of displaying message or alert information such as, for example, but not limited to, an electronic highway sign, AMBER alert sign. In addition, the terminal 105 may be or include a siren or other device capable of providing an audible or visual output in response to receiving a message or alert from the messaging subsystem 101. Further, the messaging subsystem 101 may re-send messages or alerts to other systems (e.g., external to system 100) for distribution to users or other systems. This is not an exhaustive list of the terminals 105 for which the messaging subsystem 101 may be configured to support for messaging, but is provided herein as an example of the breadth of output means supported for message delivery by the messaging subsystem. In at least one embodiment, the messaging subsystem 101 may be configured to output one or more second messages or alerts to one or more of these terminals 105. The messaging subsystem 101 may be included in a system 100 that provides message processing and transfer as described herein.

In operation, referring to FIG. 1, the messaging subsystem 101 may cause messages, such as the second messages, to be sent to one or more of the user terminals 105 such as, for example, cell phones and pagers, via one or more of the gateways 104 using a non-voice traffic channel of the communication network 107. In at least one embodiment, a message may be transferred to one or more terminals 105 using an SMS channel of a GSM based wireless communication network 107. Furthermore, a message may be transferred to one or more terminals 105 using a paging network 107. Alternatively, a message may be transferred to one or more terminals 105 using a control channel of the communication network 107. In an embodiment, the network 106 may be a packet-based network having a logical termination at the gateway 104. For example, the network 106 may be a Transmission Control Protocol/Internet. Protocol (TCP/IP) network such as, for example, the Internet, for which the gateway 104 is a destination IP socket for receiving non-voice based information, or messages, ultimately destined for one or more terminals 105 served by the network 107. Message delivery to the user terminal 105 may be accomplished with high reliability because the non-voice channel bearing the message remains available in the event that the voice channel is saturated or otherwise not accessible for completing a voice call.

Furthermore, the user terminal 105 may provide a confirmation to the messaging subsystem 101 via the network 106 signifying that the notification information contained in the gateway message has been received by particular user terminals 105. In at least one embodiment, the messaging subsystem 101 may provide reply tracking as described herein to inform the alert originator 102, as a minimum, of the successful dissemination of a message such as an alert message. Furthermore, messaging subsystem 101 may collect the status of individual replies and report the status to the alert originator 102 to assist emergency personnel in responding to an emergency or potential emergency situation.

In at least one embodiment, the networks 103, 106, and 108 may be a public network such as the Internet. However, communications systems used to implement the networks 103, 106, and 108 may include, but are not limited to, telephone landline based modem or a wireless network such as a cellular digital packet data (CDPD) network or a wireless local area network (LAN) provided in accordance with, for example, the IEEE 802.11 standard.

In at least one embodiment, the messaging subsystem 101 may use the networks 107 of different carriers to deliver text messages to user terminals 105 including, but not limited to, pagers, wireless PDAs, cell phones, IP-based phones (e.g., voice over IP), and satellite phones. In an embodiment, cell phone text message networks 107 may communicate over the control channel of the respective cellular networks. As described hereinabove, the control channel may be a channel separate from the voice channel that continues to be available for message traffic when voice channels are saturated and unavailable to complete voice calls. In an embodiment, the underutilized control channel may not require a persistent connection and is also capable of providing reliable communications under degraded channel situations. When used in combination with another communication medium such as, for example, one or more paging networks, cellular text messaging by the messaging subsystem 101 provide reliable and fast emergency communication when other means of communication such as, for example, voice systems, are not available.

Figure 2:
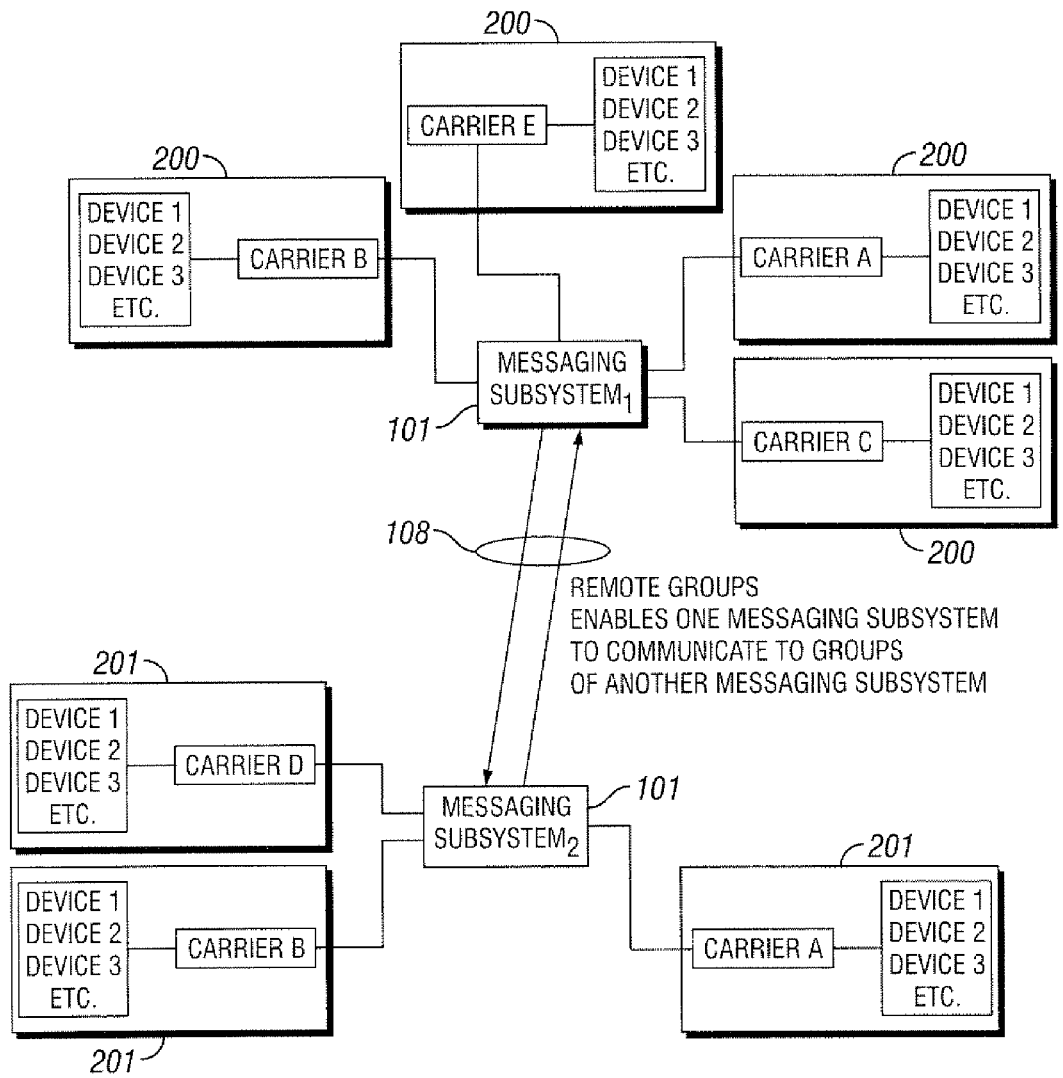
FIG. 2 is an illustration of message groups associated with multiple messaging subsystems according to an embodiment.

In an embodiment, each of the user terminals 105 may be associated with at least one message group 200 as shown in FIG. 2. Message groups 200 may include multiple user terminals 105, such as, for example, the devices 1, 2, 3 through "n" as shown in FIG. 2. Each terminal 105 may be associated with a user. Each group 200 may have at least one defining characteristic. For example, a message group may include a set of user terminals 105 accessible using the same Internet domain name (e.g, user_1@common_domain.gov). Alternatively, a message group may include a set of user terminals 105 accessible by a particular network 107 such as, for example, a particular carrier or wireless telecommunications service provider (e.g., T-Mobile) as shown in FIG. 2. Moreover, in an embodiment, a first messaging subsystem 101 may be coupled to at least a second messaging subsystem 101, wherein the first and second messaging subsystems 101 are configured to provide message transfers between the user terminals 105 coupled to the first messaging subsystem 101 and associated with one or more message groups 200, and the user terminals 105 coupled to at least a second messaging subsystem 101 and associated with one or more second message groups 201. This capability supports cross-jurisdictional communication and cooperation for responding to emergencies, because diverse or previously isolated communications systems may be networked together for message transfer among the systems.

Furthermore, user terminals 105 may be categorized according to response group (not shown). For example, a response group may include the user terminals 105 associated with individual members of an emergency response team for a given government agency (e.g., the U.S. Secret Service). In at least one embodiment, the messaging subsystem 101 may maintain status for each user registered user terminal 105 classifying the user associated with the user terminal 105 as one of an administrator, a manager, and a non-originating user for the message group. In an embodiment, administrators may have greater system privileges relative to managers, and managers may have greater system privileges relative to non-originating users. For example, in at least one embodiment, an administrator(s) of an organization may be allowed to build and send an alert message as an alert originator 102. In an embodiment, the alert originator 102 may utilize a user terminal 105 to access the messaging subsystem 101 and to generate an alert message. The messaging subsystem 101 may include features to assist an administrator in building an alert such as, for example, but not limited to, using different colors in the build page (e.g., red background) to remind the alert originator of the type of alert he is building (e.g., red for a biological alert). Also, the messaging subsystem 101 may provide partially completed alert build pages for particular emergency situations, having predefined fields and message text, such that the administrator only has to "fill in the blanks" for additional information, in order to increase the speed in which an administrator may originate an alert. In at least one embodiment, the messaging subsystem 101 may provide fully completed alert message templates. Such completed message templates may include, for example, but not limited to, predefined message text and predetermined recipient or user groups. Furthermore, an administrator may be provided the capability to define the additional questions posed to an individual user during registration of the user, in order to collect particular information useful in assembling an emergency response team in the case of threat or actual emergency event. For example, a hospital administrator may wish to collect information identifying employees having four-wheel-drive vehicle, in case of a snow emergency.

In an embodiment, users of the system 100 may be classified according to a variety of criteria for message generation privileges and varying degrees of system access. For example, a user of the system 100 may be a sender. A sender may be assigned a unique PIN for message origination to allow the messaging subsystem 101 to determine that the sender is an authorized sender. A user may also be a manager, an administrator, or a non-originating user. An administrator has the highest level of message sending and information access. For example, an administrator may be provided access to an interactive page that provides an administrator console. By interacting with the administrator console, an administrator may add, change, or delete user or device related information maintained by the messaging subsystem 101. In an embodiment, the administrator console page may provide interactive fields and icons that are not provided to or accessible by other users. The administrator may also define the access privileges of other users in a group or particular organization. A manager may be able send only those messages for which an administrator has granted send privileges to the sender, in an embodiment, but may however be permitted to add, delete, or modify user registration information or device information, or to undertake other maintenance activities using the messaging subsystem 101. In an embodiment, managers may also authorize particular users in their group to be senders. Non-originating users may be able to receive messages via their associated user terminal(s) 105. Non-originating users may also be able to access, add, or modify only the information for themselves. In an embodiment, to de-register, a non-originating user must obtain permission from a manager or administrator.

Figure 3:
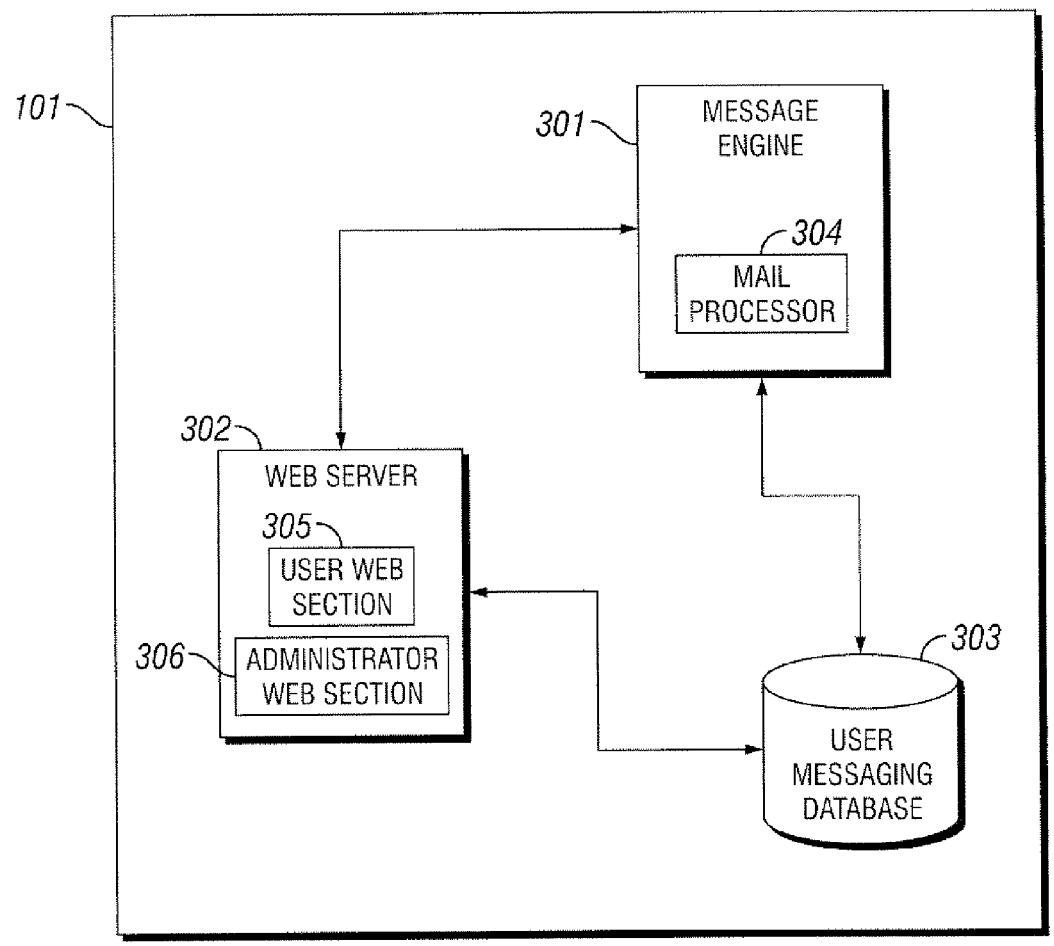
FIG. 3 is a functional block diagram of a messaging subsystem according to at least one embodiment.

Further detail regarding the messaging subsystem 101 according to at least one embodiment is shown in FIG. 3. Referring to FIG. 3, the messaging subsystem 101 may include a message engine 301 which may be coupled to a web server 302, and a user messaging database 303 which may be coupled to both the message engine 301 and the web server 302. The message engine 301 may further include a self-contained electronic mail processor 304 configured to, as a minimum, transfer electronic messages to communication gateways 104. The message engine 301 may include a sequence of programmed instructions that when executed in cooperation with the web server 302 and the database 303 cause the messaging subsystem 101 to perform the functions described herein. In at least one embodiment, the instructions may be implemented in the form of Practical Extraction and Reporting Language (Perl) script code. Furthermore, the message sending process may be launched by, for example, a Hypertext Preprocessor (PHP) as code implemented using Perl scripts such that the Perl code is executed by a PHP-driven web interface. Alternatively, the Perl scripts may be implemented as Common Gateway Interface (CGI) scripts used to transfer information between the web server 302 and the message engine 301. Alternatively, the messaging subsystem 101 may be implemented using instructions provided in accordance with the C/C++, Java™, or Python™ programming languages.

In an embodiment, the message engine 301 may be configured such that multiple different modules (i.e., communication system/device capabilities) are supported and will interact with the mail processor 304. Thus, multiple message delivery methods may be supported and capabilities to support new alert/message target devices added as needs and communication capabilities evolve. In at least one embodiment, the user terminals 105 or devices may be grouped by the message engine 301 by delivery method (e.g., communications system) to allow messages or alert messages to be sent to several devices in a single delivery attempt to minimize the number of connections (e.g., IP connections) made by the message engine 301.

In an embodiment, upon receiving a first message, such as a first alert message, the message engine 301 may cause a corresponding second message, such as a second alert message, to be delivered to one or more user terminals 105. In particular, the second message may be transferred or broadcast to a large number of user terminals 105 associated with one or multiple response groups within a very short period of time. In at least one embodiment, the time from the first message being initiated by the alert originator 102 to the time that the first of the intended recipient user terminals 105 receive a corresponding second message or alert via the network 107 may be within two seconds.

The message engine 301 may group user terminals 105 by their carriers to deliver messages to multiple devices in a single gateway message transmission. By thus transferring messages to multiple carriers via the communications gateways 104, combined with the parallel processing of individual carriers, allows the system 100 to process and submit for delivery messages for tens of thousands of users in a few seconds. The message engine 301 may monitor the arrival of the first messages or alert messages through various arrival methods and interfaces. In case the first message contains special characters and/or formatting (e.g., multi-media messages), the message engine 301 may also parse the message received from the alert originator 102 to extract the actual textual information and, if necessary, dissect the message into smaller pieces appropriate to the user terminal 105 (e.g., a mobile device) memory and display limitations. Thus, in converting the first message or alert message received from the alert originator to a gateway message, the message engine 301 may reformat, for each of the one or more gateway messages, the first message received from the alert originator 102 to a format in which the communication gateway 104 associated with the gateway message will accept and perform operations in response to the incoming gateway message. Further to the conversion process, the message engine 301 may form an address for each of the one or more gateway messages to include the domain name information associated with the communication gateway 104 and the user identification information (e.g., "username@goverment_agency.gov") associated with the registered user receiving the second message. Thus, in an embodiment, the message engine 301 may reformat and adapt the first message into a mobile device text message adaptation (i.e., e-mail dissection).

Furthermore, in at least one embodiment, in converting the first message or first alert message to a gateway message, the message engine 301 may accommodate the text message limitations of the particular network 107. For some networks 107, the full message as received from the alert originator, or as originated by an administrative user via the web server 302, may not fit into a single text message due to character limits set by the individual carriers. For example, the Sprint™ network supports 100 characters per message. Therefore, in order to receive a 500-character message, a user would need to receive five messages via the Sprint™ network to his user terminal 105. In such a case, the message engine 301 may dissect the message received from the alert originator into multiple text messages. The inventors have discovered an optimal character limit for each device or user terminal on particular networks 107. The optimal character limit may be determined based on achieving ease of output for user quick recognition on a display of the user terminal, as well as for efficient routing throughout the particular network 107. These parameters may be stored using the database 303 and retrieved by the message engine 301 as required for particular gateway alert messages. For electronic messages (i.e., "e-mail"), the message engine 301 may further include the sender, subject and the text in the body of the e-mail message transferred to the communication gateway 104. The message engine 301 thus enables message originators to focus on the content of their message and not the final format for delivery to specific mobile devices.

In addition, in an embodiment, the message engine 301 may parse or strip all or a portion of the header and message content of the first message as received from the alert originator 102 based on the message parameters required by the network 107 for the type of message to be delivered. Such parsing may include sending only the actual textual part of the e-mail, stripping out possible headers, HTML code, or cc'ed address information. Thus, the message engine 301 may associate a unique set of message parameters with each of the communication gateways 104. The messaging subsystem may then transmit a gateway message or gateway alert message to one or more of the user terminals 105 via one or more of the communication gateways 104 in accordance with the set of the unique message parameters for each communication gateway 104, in response to receiving an alert message or first message from the alert originator 102.

The message engine 301 may also provide the capability for non-originating users to be organized into administrator defined alert groups. The message engine 301 may then be configured by an administrator to send alert messages to one or more of the alert groups, thereby allowing for communication to specified subsets of users depending on the nature of the message. An example of a group membership interactive page 400 provided in at least one embodiment is shown in FIG. 4. Referring to FIG. 4, non-members 401 may display a list of all registered users on the system. Members 402 may display a list of all registered users who are members of the particular group. An Adminstrator can select any number of non-members and click "Add" to make them members of the group.

Furthermore, users in one alert group served by a first messaging subsystem 101 may exchange alert messages with the users of a remote alert group served by another messaging subsystem 101. In an embodiment, remote groups (i.e., groups set up by administrators of other messaging subsystems 101) may be displayed (or otherwise output) to a user as regular local groups in the send alert user interface. FIG. 5 depicts a Graphical User Interface (GUI) for configuring remote user messaging groups in at least one embodiment. Referring to FIG. 5, the form field Group Name 501 may be the name of the group to be created. The form field Short Group Name 502 may be an abbreviated name for the group to be created. The form field Group Code 503 may assign a code to the group to be created. The form field Remote Server 504 may designate the server on which the remote group is stored.

In at least one embodiment, users can have multiple devices (i.e., multiple user terminals 105) each having the capability to receive messages from the messaging subsystem 101. For example, each user terminal 105 may have e-mail access to the same or different networks 107. This diversity provides for redundancy over different carriers and infrastructures to increase the probability of successful delivery of a message to a user.

Furthermore, the message engine 301 may track the confirmation or other response received back from the user via the user terminal 105 in real-time in order to collect and maintain the status of user responses to alert messages and lists users that have not responded as well as providing information on bounced/undeliverable messages or out of office replies. A GUI including an alert tracking interactive page 600 provided in an embodiment is shown in FIG. 6. Referring to FIG. 6, the "Alert #" field 601 may display a unique numeric identifier for a particular alert message. The "Groups" field 602 may show the name of each group of users a sender has assigned to receive the alert message. The "To" field 603 may display a graphical icon for each delivery channel or "device type" a sender has selected to receive the alert message. The "#" field 604 may show the number of users who received the alert message. The "Responses Confirmed" field 605 may display the number of users who have responded to the alert message. The "Responses Other" field 606 may display the number of replies to a message that are not confirmed as valid responses from users, e.g. invalid message recipient replies or "bounce-backs", "out of office" replies and other such responses.

In at least one embodiment, the messaging subsystem 101 may be deployed as a standalone server solution with no software to install on other servers, user's client computers, or mobile devices. Alternatively, the messaging subsystem 101 may be implemented as an Application Service Provider (ASP) based service hosted separately from the user organization's existing systems and accessible via a network such as the Internet. In an embodiment, the messaging subsystem 101 may be implemented using, for example, open source operating system software such as Linux. In an embodiment, the user messaging database 303 may be a Structured Query Language (SQL) database. In at least one embodiment, the messaging subsystem 101 may be based on the Linux operating system. Alternatively, the messaging subsystem 101 may be based on Microsoft Windows™ NT/XP™, Sun Solaris™, or Open BSD™ Unix™ provided by Berkeley Standard Design, Inc. of Berkeley, Calif.

Users may access the system 100 via, for example, a packet-based network such as the World Wide Web. In at least one embodiment, the web server 302 may provide a web interface by which users may subscribe, enter, and manage information specific to their user terminals 105 or mobile device(s) and/or e-mail accounts. In particular, the messaging subsystem 101 may be setup entirely by an administrator to centralize the initial registration process (as described herein). Furthermore, in an embodiment, users of all levels may be provided the capability to register themselves, thereby relieving the administrative burden on the user organization.

In at least one embodiment, the web server 302 may provide the interface between the user and the system 100 to collect and display information related to messaging subsystem 101 accounts and operational settings. Referring to FIG. 3, the web server 302 may further include a user web section 305 and an administrator web section 306. The user web section 305 may include a sequence of programmed instructions that configure the web server 302 to allow users to sign up for an account, or register, and enter their device or user terminal 105 information. For example, a registering user may enter her cell phone number and carrier (or wireless device/e-mail address). Users with existing accounts may access a "MyService" account page provided for the purpose of, for example, allowing users to modify their profile and terminal 105 information, send alerts if they are authorized users, and access the online help via the FAQs and help pages. Furthermore, the user web section 305 may allows users to set up multiple devices including e-mail addresses for alert deliveries. For example, a user may select his cell phone, work e-mail, home e-mail, and his spouse's cell phone, pager, and work e-mail. In at least one embodiment, a user may send a self test message to all of his selected devices. By entering the necessary access information for each of these user terminals 105 associated with the user, the system 100 will provide an alert message to each such user terminal 105 associated with the user for messages or alerts intended for receipt by that user.

The administrator web section 306 may allow users having administrator level access authorization (e.g., "administrators") to send alerts or messages, view and modify all account information, create and assign membership to groups, modify system settings, view usage and summary statistics, produce reports, and backup the messaging subsystem data. Administrators may enter new users and modify their information allowing for setup and use of the system 100 without any end user involvement. Administrators may send messages or alert messages to one or more groups. Further, the administrator web section 306 provides an advanced group sending capability that allows members of one or more groups that are not members of other particular groups to receive messages. This is useful for situations in which a user is a member of several groups and the same message is sent to each of those different groups over time. Thus, the advanced group sending capability eliminates duplicate messages going to the same recipient.

In at least one embodiment, the web server 302 may provide detailed logging of all messages. The web server 302 may also provide a report generation capability for rendering and outputting to a requesting administrative user an indication of all previous alert messages along with alert source, date, time, and delivery information. Further, the web server 302 may also provide response logs for rendering and outputting to a requesting administrative user real-time information to track the replies that users send in response to receiving the second messages, thus providing true receipt status. This response log information may include an indication of particular users that have not responded as well as devices or user terminals 105 that have bounced (i.e., not accepted the message) or for which messages are undeliverable. Furthermore, in an embodiment, the web server 302 may include a tool to create a group on the fly allows administrators to quickly send a message to users that have not responded, for example. Secure Socket Layer (SSL) security may be optionally provided to ensure privacy during connections to the web server 302. In at least one embodiment, the web server 302 may be based on the open source Apache Web Server originally developed by the Apache Group, the source code for which is publicly available from various sources including the World Wide Web. Alternatively, the web server 302 may be implemented using the Microsoft Internet Information Server (IIS™) for Windows™ NT platforms. In at least one embodiment, the database 303 may include a preprocessor such as, for example, the open source, server side Hypertext Preprocesser (PHP), for creating dynamic World Wide Web pages. PHP scripts are compatible with many database systems.

The user messaging database 303 may be used to store message and user account information for the system 100. Upon user request, information contained in the database 303 may be retrieved and provided to the web server 302 for rendering and outputting to the requesting user using, for example, an HTTP interface to the web server 302. Furthermore, the message engine 301 may obtain information stored in the database 303 to prepare and deliver messages to the user terminals 105 via gateway message sent to the communication gateways 104.

In an embodiment, the user messaging database 303 may include a database management system (DBMS) software application such as the MySQL® open source Relational Database Management System (RDBMS) available from MySQL AB of Sweden, the source code for which is publicly available from various sources including the World Wide Web, for storage and retrieval of, for example, user account or message format data in accordance with the Structured Query Language (SQL) database format. Alternatively, the database 303 may be implemented using SQL Server 7.0 provided by Microsoft Corporation, or similar products provided by Oracle® Corp. of Redwood Shores, Calif. or the open source PostgreSQL.

In one embodiment, the database 303 may execute a sequence of SQL scripts operative to store or retrieve particular items arranged and formatted in accordance with a set of formatting instructions. For instance, the database 303 may execute one or more SQL scripts in response to a request from the web server 302 to receive particular items of user account information in a format suitable for transmission to and display by the user terminal 105 using a web browser software application such as, for example, Internet Explorer™ provided by Microsoft Corporation. In one embodiment, the database 303 may communicate with the web server 302 and the message engine 301 in accordance with the Open Database Connectivity (ODBC) standard developed by Microsoft Corporation.

Further, the web server 302 may be used in an embodiment to generate and transmit interactive HTML or XML pages to the alert originator 102 via the network 103 and to the user terminal 105 via the networks 106 and 107. In particular, the web server 303 may receive requests for information as well as user entered data from the alert originator 102 or the user terminal 105. Such user provided requests and data may be received in the form of user entered data contained in an interactive HTML or XML page provided in accordance with the Java Server Pages™ standard developed by Sun™ Microsystems. Alternatively, user provided requests and data may be received in the form of user entered data contained in an interactive HTML or XML page provided in accordance with the Active Server Pages (ASP) standard. In response to a user entered request, the web server 302 may generate a report in the form of an interactive HTML or XML page by obtaining user and alert data, which may include alert tracking date, corresponding to the user request by transmitting a corresponding command to the database 303 requesting retrieval of the associated data. The database 303 may then execute one or more scripts to obtain the desired information and provide the retrieved data to the web server 302. Upon receipt of the requested data, the web server 302 may build an interactive HTML or XML page including the requested data and transmit the page to the requestor in accordance with, for example, HTML and Java Server Pages™ (JSP) formatting standards.

In an embodiment, the messaging subsystem may further include a firewall (not shown) to protect the system 100 against unauthorized access. The firewall functions to exclude unknown or unauthorized users from accessing the 100.

Figure 7:
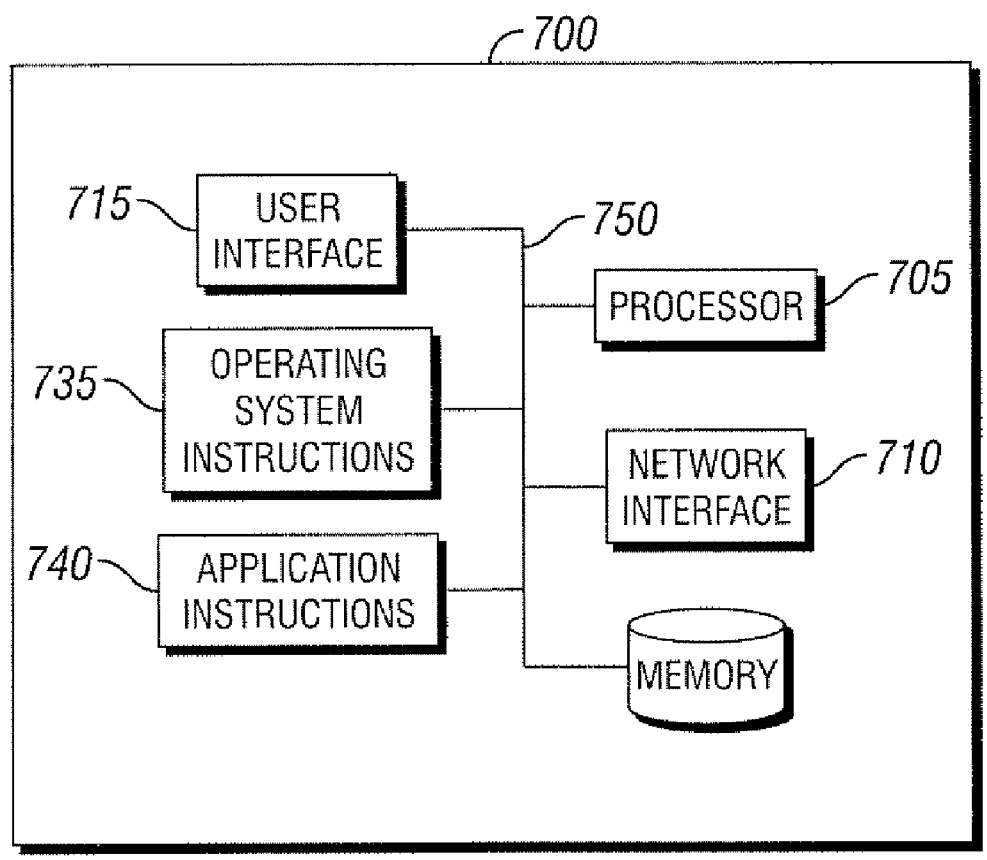
FIG. 7 is a functional block diagram of one embodiment of a computing platform.

The message engine 301, web server 302, and user messaging database 303 may be implemented in the form of application software executing on at least one computing platform. FIG. 7 is a functional block diagram of one embodiment of a computing platform 400 useful for hosting software application programs implementing the message engine 301, web server 302, and user messaging database 303. Referring now to FIG. 7, the computing platform 700 includes a processor 705, a network interface 710, a user interface 720, operating system instructions 735, application executable instructions/API 740, all provided in functional communication using a data bus 750. The processor 705 may be any microprocessor or microcontroller configured to execute software instructions implementing the functions described herein. Application executable instructions/APIs 740 and operating system instructions 735 are stored using computing platform 700 nonvolatile memory. Application executable instructions/APIs 740 include software application programs implementing the message engine 301, web server 302, and user messaging database 303. Operating system instructions 735 include software instructions operable to control basic operation and control of the processor 705. In one embodiment, operating system instructions 735 may include the NT™ operating system available from Microsoft Corporation of Redmond, Wash. In at least one embodiment, the computing platform may be a PC provided by Dell Computer of Round Rock, Tex.

As described previously, the message engine 301, web server 302, and user messaging database 303 may each reside on a single computing platform 700, or on more than one computing platform 700, or each application may reside on a separate computing platform 700. In an embodiment, the messaging subsystem 101 may be scaleable such that additional message engines 301, web servers 302, and user messaging databases 303 may be added to the messaging subsystem 101 as required to increase message transfer speed or to maintain system 100 capabilities as subscribers to the service increase. Application executable instructions/APIs 740 and operating system instructions 735 are loaded into one or more allocated code segments of computing platform 700 volatile memory for runtime execution. In one embodiment, computing platform 700 includes 256 MB of volatile memory and 20 GB of nonvolatile memory storage.

Application executable instructions/APIs 740 may include one or more application program interfaces (APIs). The messaging subsystem 101 application programs may use APIs for inter-process communication and to request and return inter-application function calls. For example, an API may be provided in conjunction with the database 303 in order to facilitate the development of SQL scripts useful to cause database 303 to perform particular data storage or retrieval operations in accordance with the instructions specified in the script(s). In general, APIs may be used to facilitate development of application programs which are programmed to accomplish the messaging functions described herein, such as the addition of new communication modules and integration with third party products.

Returning to FIG. 7, the network interface 710 may provide the computing platform 700 the capability to transmit and receive information over the Internet, including but not limited to electronic mail, HTML or XML pages, and file transfer capabilities. To this end, the network interface 710 may further include a web browser such as, but not limited to, Microsoft Internet Explorer™ provided by Microsoft Corporation. The user interface 720 may include a computer terminal display, keyboard, and mouse device. One or more Graphical User Interfaces (GUIs) also may be included to provide for display and manipulation of data contained in interactive HTML or XML pages.

Thus, the system 100 may provide a solution for emergency alert notification. In particular, the messaging subsystem 101 may be device and carrier agnostic, adhering to applicable Internet and wireless standards to allow the messaging subsystem 101 to work with existing carriers and equipment. Furthermore, the system 100 provides reliable and fast message delivery, simple web-browser based management, networking capabilities for forming coalitions between multiple messaging subsystems 101, and easy interfacing with existing emergency-management infrastructure. For example, a first messaging subsystem 101 may be coupled to a second, third, etc. message processing system 101 using, a network 108 for example as shown in FIG. 1, to allow messages to be shared between diverse users and groups served by any particular messaging subsystem 101. This permits, for example, an alert message originating from the Department of Energy and received at a first messaging subsystem 101 to be shared with a member of a local government fire and rescue team via a second messaging subsystem 101. This capability permits interoperability among different organizations and agencies, thereby improving inter-jurisdictional coordination among agencies at various levels of government in effectively responding to an emergency. Thus, emergency response personnel are provided with flexible and powerful message (e.g., alert message) distribution within and across organizational boundaries. Finally, by utilizing certain aspects of existing technologies and infrastructure that most companies and organizations already have in place, the system 100 provides for fast, incremental, and cost-effective installation.

Furthermore, the system 100 may include, in at least one embodiment, certain capabilities that further serve to improve the ability of users to communicate effectively. For example, the system 100 provides very high reliability due to, for example, redundancy of delivery channels to multiple user terminals 105. In an embodiment, use of a non-voice channel to transfer messages to user terminals 105 also provides increased reliability with respect to voice-based systems and methods. In fact, the messaging subsystem 101 is in many cases able to continue to function effectively when other communication methods have failed. By sending messages to all mobile devices and e-mail boxes registered for each user, the likelihood of successful message delivery to the user by at least one of the redundant communication channels is high. Further, because most of these channels are disjoint any outage on one will not affect delivery through the others.

Still further, the messaging subsystem 101 may be made redundant across several servers to provide for service with reduced points of failure. The features of the messaging subsystem and design may ensure that the alert message is received, processed, and delivered to the users at their defined devices. Once users are registered with the system, the messaging subsystem simplifies the alert originator's task in drafting the emergency alert. The messaging subsystem may handle packaging the message and ensuring it is delivered in the best legible format appropriate for the users' device(s).

In addition, the system 100 may deliver messages very quickly to user terminals 105, thus increasing response time and response force for an emergency response team. Emergency messages, for example, are usually time-critical. The system 100 may be able to deliver messages to thousands of recipients within a few seconds.

Furthermore, in an embodiment, users of the system 100 do not need to substantially modify their existing routines to implement the system 100. The messaging subsystem 101 may be implemented by a new user without adding new system interfaces, for example. In addition, the messaging subsystem 101 may be implemented in conformance with industry standards and equipment. In at least one embodiment, the messaging subsystem 101 may be implemented using open source software components. Therefore, the system 100 is not intrusive to the user's existing systems and does not require retrofitting or software modification of existing systems. The messaging subsystem 101 may be able to be used with standards based or proprietary existing systems. Thus, the messaging subsystem 101 may be added even for situations in which the installation of any integration software is not feasible. However, these same characteristics allow the messaging subsystem 101 to be integrated with existing alert initiation technology for users that already have systems in place that monitor events and trigger alerts accordingly.

Furthermore, the system 100 may include plug-and-play installation functionality with existing systems. In particular, the system 100 may be a server-based solution that may be delivered and installed as a network appliance. In an embodiment, few steps are required to deploy the system 100. For example, adding a messaging subsystem 101 capability may be accomplished by: 1) Connect the box into the network; 2) Assign an internal or publicly available name to the system for easy web browser access; and, 3) Either establish two external e-mail boxes or modify Domain Name Server (DNS) Mx entries to direct SMTP traffic for any specific domain into the messaging subsystem box. The last step may be a quick customization of the system through the administrative console. DNS MX records identify the mail server(s) responsible for handling electronic mail for a domain name.

Figure 8B:
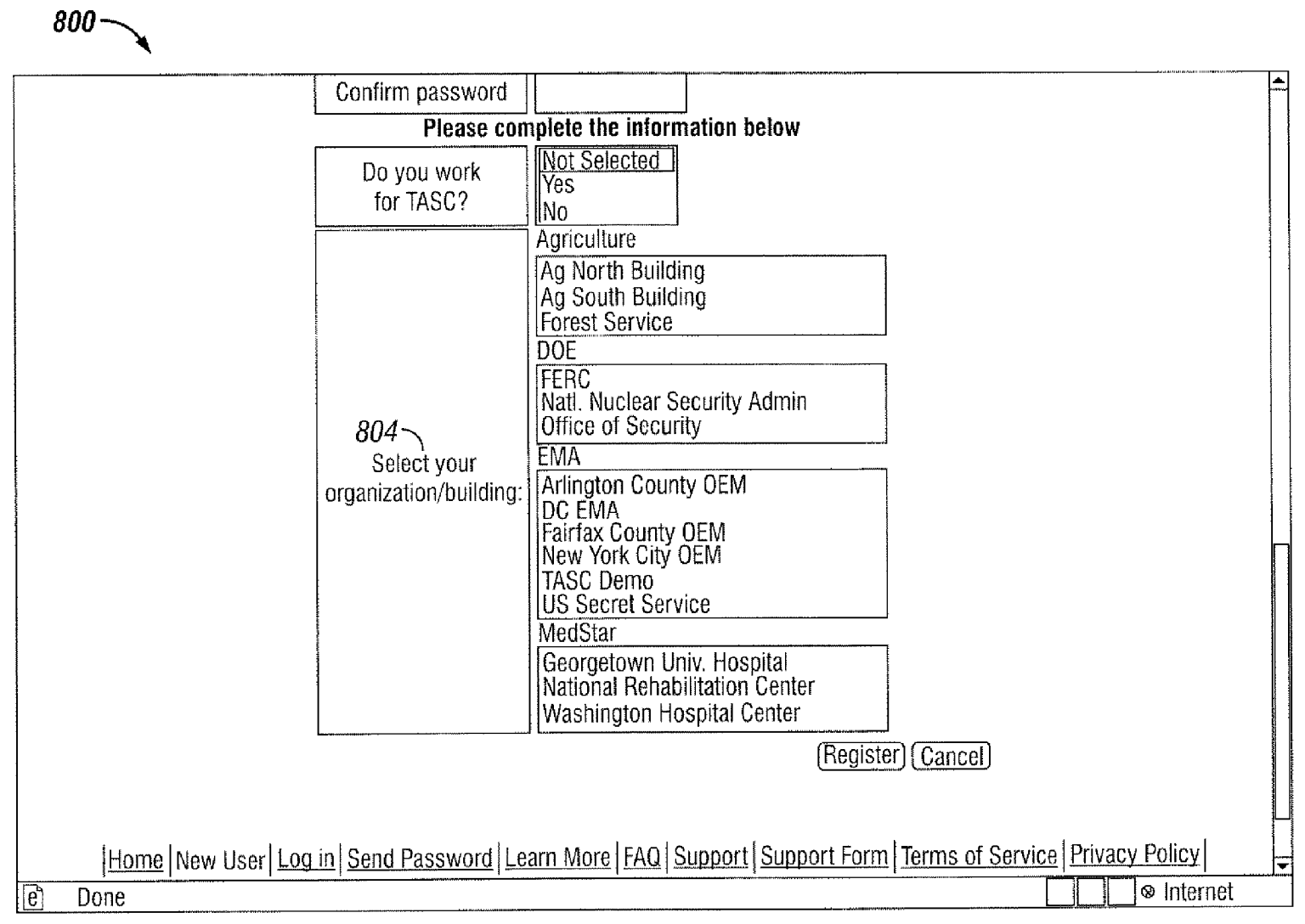

In an embodiment, the system 100 may provide high data integrity and accuracy. For example, by allowing users to self-register, data integrity is increased because at least one step in database population or registration of users is eliminated. For example, registering users do not have to first enter their contact, etc. information onto a standard form for later data entry by clerical personnel. Furthermore, because users can enter their information directly, the system 100 may provide for relatively easier maintenance for both users and administrators in maintaining the consistency of the database. Furthermore, the system 100 may provide user friendly initial user registration. In particular, to register, a user may provide basic information such as his or her name, e-mail address and optionally one or more mobile devices, and this may be the only step each user has to take to register and participate in the system 100. In an embodiment, no changes to any other setup, no installation of additional software or periodical maintenance is required. An example of a registration interactive page 800 provided in at least one embodiment is shown in FIGS. 8a and 8b. Referring to FIG. 8a, the form fields Name and Email Address 801 may be for the user's name and email address. The email address uniquely identifies the user in the database. The form field Cell Phone/Mobile Device Carrier 802 may allow the user to select a carrier or device identifier for each device registered. The form field Password 803 may allow the user to create a password to protect the account. Referring to FIG. 8b, the field 804 may be an example of a Supplemental Information question. An Administrator may add any number of these questions to the registration process through the Administrator Console (See FIG. 10). A user's response to these questions may trigger secondary questions designed to capture more information about each individual user during the registration process.

Figure 9:
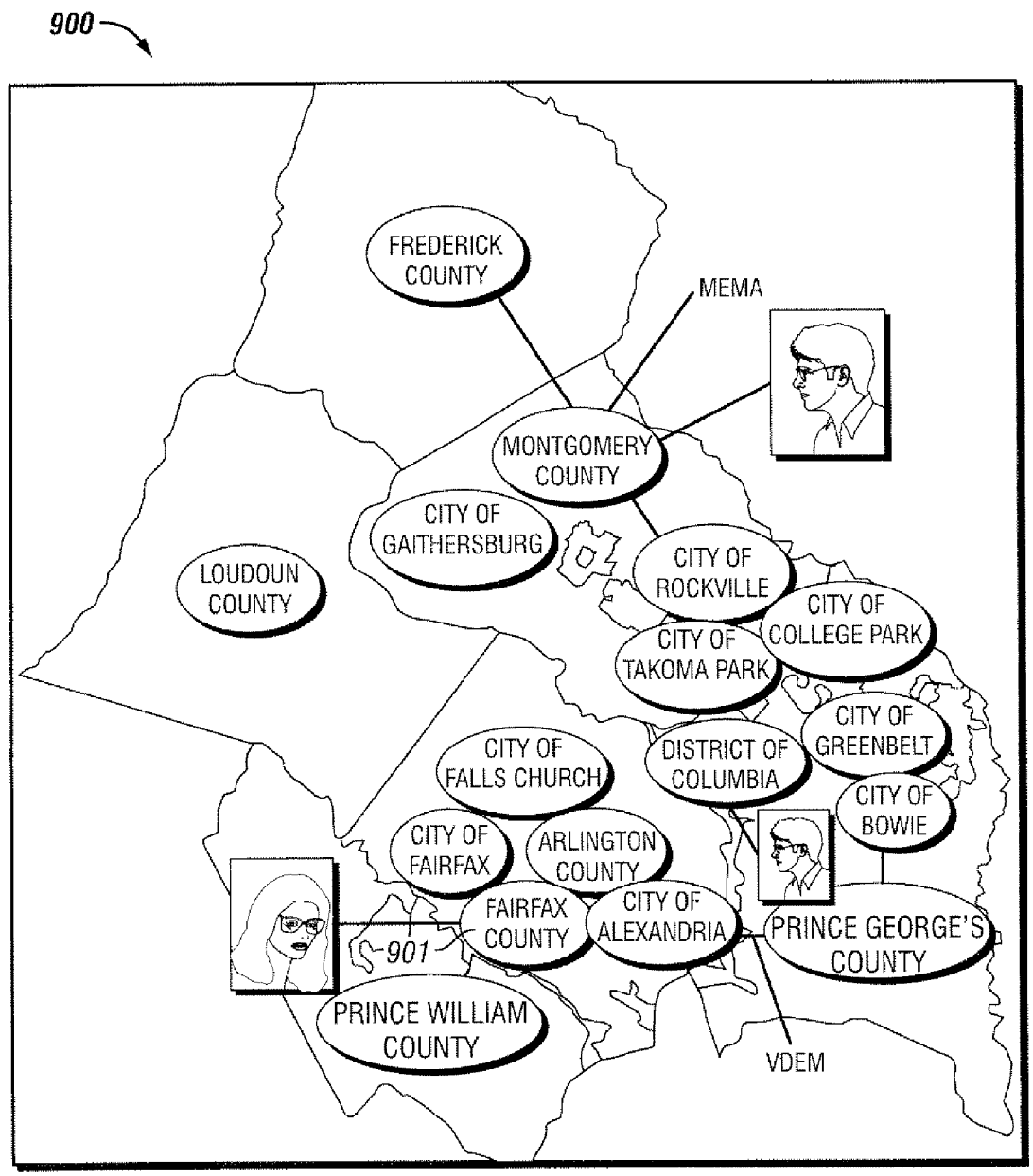
FIG. 9 is an example of a grid illustrating cross-jurisdictional messaging for emergency management according to at least one embodiment.

Further, message and user information may be shared among multiple organizations that may be served by a different one of multiple messaging subsystems 101. For example, some emergencies cross boundaries of jurisdictions and thus neighboring or otherwise related organizations may need to be included on some alert messages. In at least one embodiment, the system 100 may allow different users to form a grid of messaging subsystem 101 deployments for cross-jurisdictional alert messaging and emergency management. An example of a grid 900 according to at least one embodiment is shown in FIG. 9. Referring to FIG. 9, therein is depicted an exemplary system 100 for The Metropolitan Washington Council of Governments ("COG") deployment. COG is a regional organization of Washington, D.C. area local governments, plus area members of the Maryland and Virginia legislatures, the U.S. Senate, and the U.S. House of Representatives. COG provides a focus for action and develops regional responses to issues such as the environment, economic development, public safety, transportation and regional coordination for major disasters. Fairfax County 901 is one of the COG member jurisdictions. In this example, Fairfax County can use the system 100 to send messages to user groups 901 from any of the other jurisdictions shown on the map using Remote Groups features (See FIG. 5).

Still further, in at least one embodiment, the system 100 provides for multiple ways for alert origination as described herein. For example, an alert originator 102 may send an alert message, or first message, to the messaging subsystem 101 by HTML-formatted web page including alert originator added data in accordance with the HTTP protocol, by SMTP-formatted electronic mail message, by SMS-formatted text message, by eXtensible Markup Language (XML) formatted message, by Instant Message (IM™) provided by, for example, America Online™ of Dulles, Va., and by Short Message Service (SMS) for GSM-based networks, or from any e-mail enabled device (e.g., any e-mail client, 2-way pager, cell phone, etc.). By thus allowing authorized senders to originate an alert in various situations, multiple ways to submit alerts are provided.

In addition, the system 100 may provide instant delivery to carrier networks. For example, the messaging subsystem 101 may, for each alert message, organize devices by carrier, and then transfer to each carrier via communication gateway 104 only one gateway alert message with all the target devices listed within this message. This multicasting speeds up the message processing time within the system 100 significantly.

Figure 10:
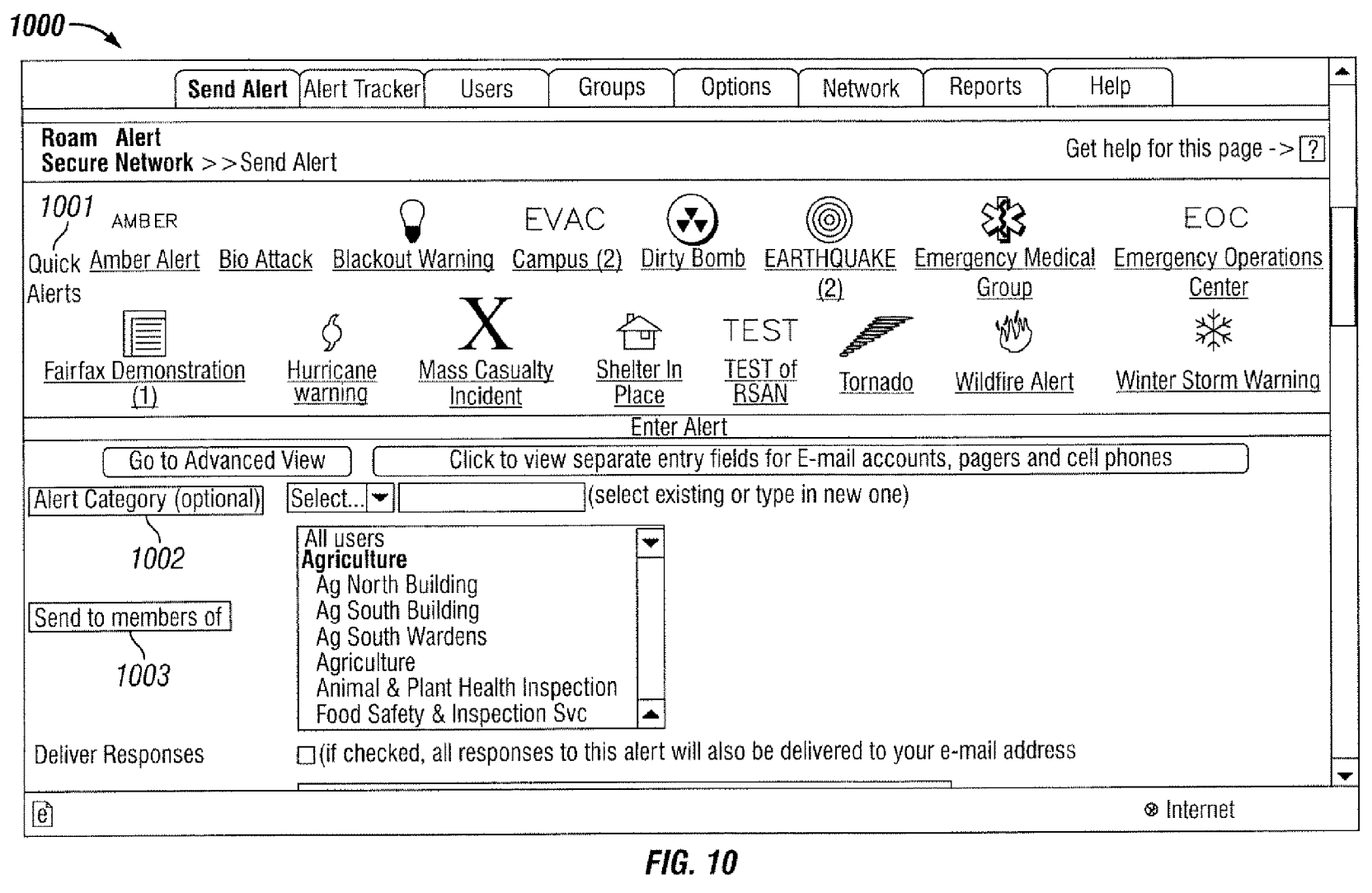
Figure 14:
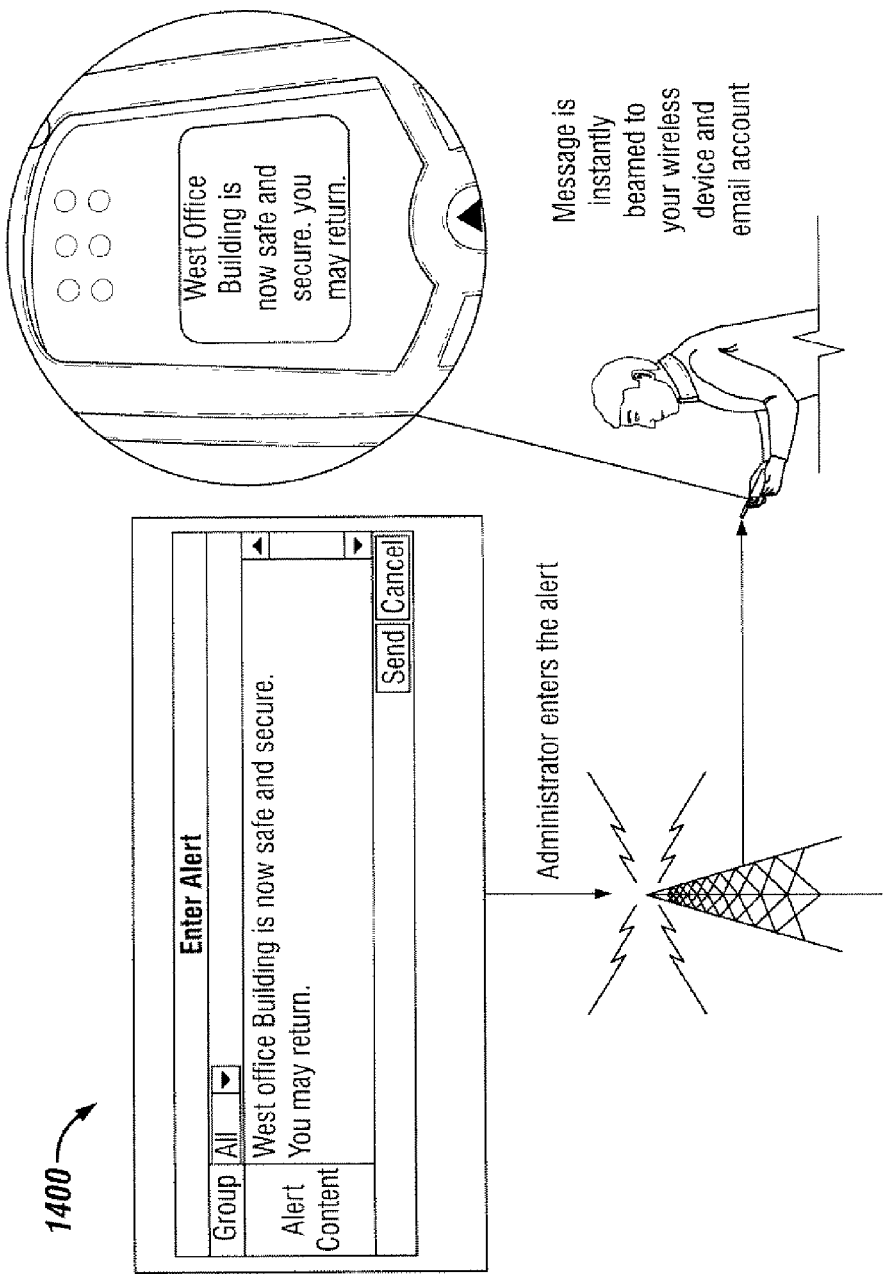
FIG. 14 is a graphical illustration of message transfer according to at least one embodiment.

Still further, the system 100 may include a simple management console that provides a straightforward yet powerful administrator console that allows authorized personnel to add, remove and modify user and device information and to form groups of individual users and authorize specific users to post alerts to defined groups. Administrators as well as authorized users can post messages to groups and/or individual users and review alert logs as well as response logs. Also, follow-up messages can be sent to non-responders, users who responded in a certain way, or any other arbitrary groups of users. In an embodiment, the home page may be a "send alert" page. An example of a management console interactive page 1000 provided in accordance with at least one embodiment is shown in FIG. 10. Referring to FIG. 10, Quick Alerts 1001 may be graphical icons that when clicked load pre-formatted alert templates and content. For example, when an Administrator or authorized sender clicks the "EVAC" icon, a preformatted alert loads automatically, saving the sender the time it would take to type the text, select the groups of recipients and configure the various sending options. The text might say, "Exit the West Office Building immediately." Or, if the message is a follow-up, "The West Office Building is now safe and secure. You may return." The sender need only click the "Send" button to send the message to pre-selected groups and devices. This process is illustrated in FIG. 14. Referring to FIG. 14, there is also shown an example of a received alert message on the display of a mobile telephone handset. Returning to FIG. 10, the Alert Category 1002 may allow the user to select a predefined alert type, so that the "from" address of the alert and potentially the source of the alert are automatically configured. The Send to Members Of 1003 may allow a sender to select individual user groups to be recipients of the alert message.

Figure 11A:
FIGS. 11a and 11b are example interactive report pages according to at least one embodiment.
Figure 11B:
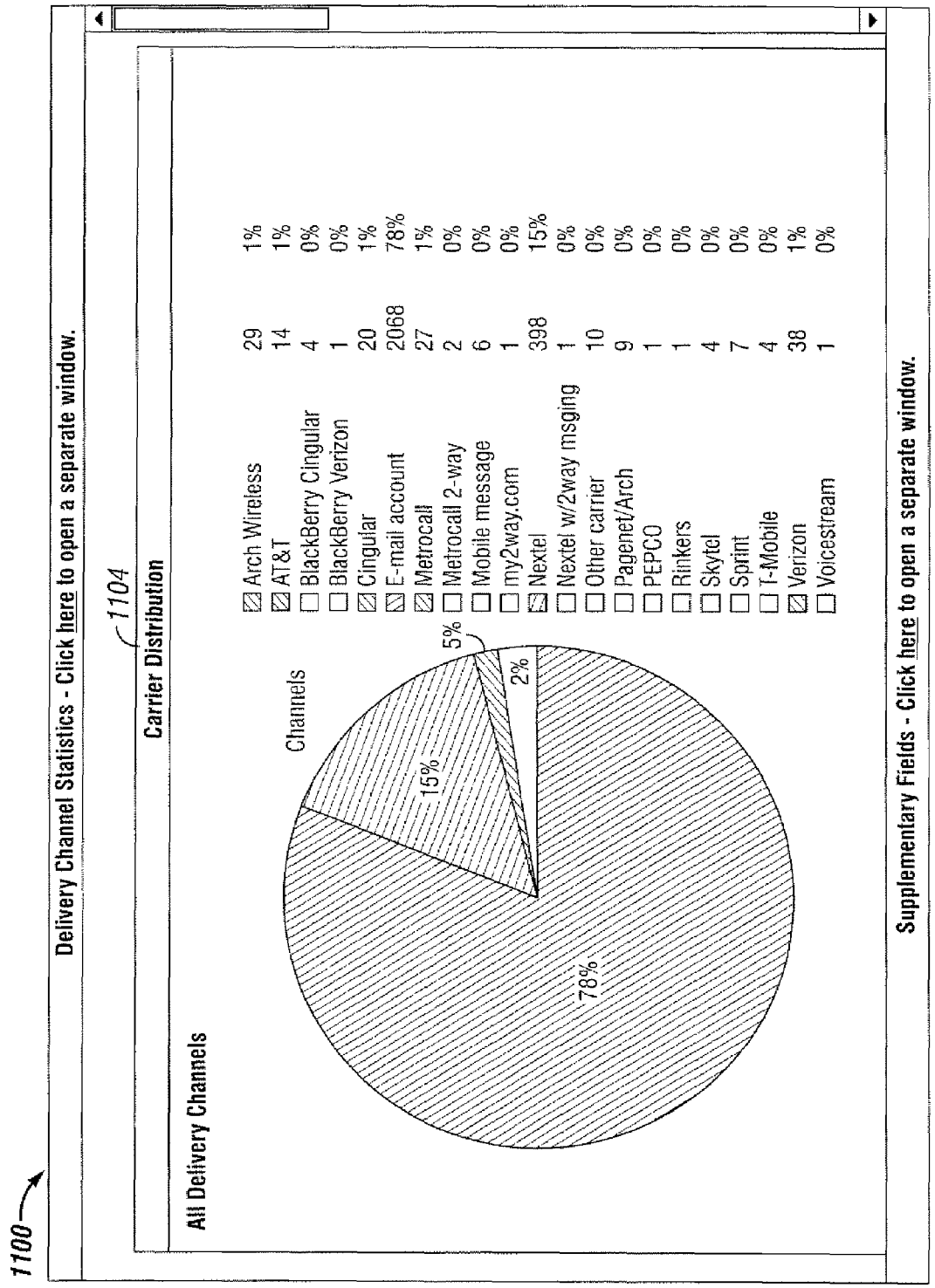

In addition, the messaging subsystem 101 may provide a report generator for producing one or more reports that include statistics and charts showing the distribution of types of user terminals and communication media or channels. Such reports may be provided in response to receiving a corresponding request from an administrator user using the administrator console. Example interactive report pages 1100 provided in at least one embodiment are shown in FIGS. 11*a* and 11*b*. Referring to FIG. 11*a*, the System Summary 1101 may output a number of system statistics Administrators find useful to track. System Management 1102 may output a list of downloadable reports, hyperlinks to their corresponding files in at least two formats and a hyperlink to download a full system backup file. The Group Distribution section 1103 may output information regarding all user messaging groups. An interactive report page 1100 illustrating an example carrier distribution report 1103 is shown in FIG. 11*b*. Referring to FIG. 11*b*, the carrier distribution report 1103 may include information in numeric and visual form such as, for example, a pie chart, showing the relative distribution of communications carriers used for sending one or more messages.

Furthermore, the messaging subsystem 101 may provide systems and methods for reply tracking including, but not limited to:

an alert tracker page,
a summary of log messages,
message log detail,
a response log,
an auto-refresh alert tracker,
the ability to send responses from users to additional recipients,
the ability to log responses by alert number,
alert tracker detail,
the ability to view alert recipients, respondents, non-respondents, and responses from identified senders, responses from unidentified senders.

Furthermore, the messaging subsystem 101 may provide systems and methods for system management including, but not limited to:

web-based system management,
the capability to be implemented as an internal (e.g., behind an organization firewall) or third-party hosted system,
the automated sending of an electronic mail to a newly-registering user on enrollment or registration,
text message confirmation,
optional privacy via SSL,
use of encrypted passwords,
use of open source software components such as Linux™,
terms of service included with the system 100,
carrier and contact information included with the system 100,
the ability to edit user information received from an administrator,
several reports pages, including real time reporting of alert messages and replies, reports showing details such as user information and devices used by a group (e.g., pie chart and data indicating distribution of device types within a group) as well as summaries of databases, carriers, and alerts,
multi-threaded processing for message delivery,
intrusion detection mechanisms included with the system,
a built-in firewall,
redundant server mirroring and capability,
voice module integration,
the ability to send HTML or XML formatted hyperlinks for certain pages,
including a network server with other system servers,
remote group integration (via other servers),
the ability to administer carrier information,
real-time monitoring of the network,
remote electronic mail generation,
the ability to receive remotely electronic mail reply messages,
the ability to remotely originate an alert message and to remotely receive replies,
the ability to export database information to external systems that may include spreadsheet applications,
the ability to easily backup the database,
the ability to customize the system, the ability to optimize system performance,
optional remote server backup of the database for a given messaging subsystem,
the ability for an administrator to specify supplementary user information to be provided at registration,
the ability to search messages for particular characters,
providing access to the system according to a multi-level access scheme,
use of a Breadcrumbs™ navigation system,
the ability to add branding to a messaging subsystem (e.g., company, corporate logo, device test message, index page master, index page test),
the ability to define contacts parameters such as contact e-mail and contact string,
providing look and feel parameters (e.g., alert templates, device class, excluded groups, incidents, multi-content, reply delivery, datestamp, priority, tagline, registration group prompt, registration signup, tracker refresh),
the ability to define and specify mail server parameters including: alert check frequency, alert password, alert mailserver, alert protocol, alert username, reply password, reply mailserver, reply protocol, reply username,
definition of and automatic sending of custom registration messages, including: update email, update cell, update pager, update email subject, welcome email, welcome cell message, welcome pager message, welcome email subject,
the ability to define and specify server setup parameters, including: an alert email, company email domain, daemon email, default email subject, keep log, network server name, product server, a reply email, sender alert identifier, and
the ability to define and specify user parameters, including: global remote alert, max invalid count, single user messaging, super manager, user remove, and user sending GUI.

Furthermore, the messaging subsystem 101 may provide systems and methods for user management including, but not limited to:

the ability to edit personal account information (e.g., edit an email account, address, school; unsubscribe; and choose an alert device to receive alerts),
the ability to self subscribe to alert types and groups,
the ability to view a user's groups,
send a forgotten password to a user,
online help,
scalable to millions of users without increasing message delivery delay,
advanced user grouping (using, e.g., a group page),
on the fly group selection and sending,
group sending authorization,
nested group capability,
multi-level access to the system for managers,
designation of groups as public or managed,
remote generation of Personal Identification Number (PIN),
searchable database of user information,
ad hoc grouping,
user self testing,
custom grouping, and
search groups.

Furthermore, the messaging subsystem 101 may provide systems and methods for other miscellaneous functions including, but not limited to:

an alert incident page that may be edited for look and feel for the incident, and providing an incident page link in the alert messages.

Figure 12:
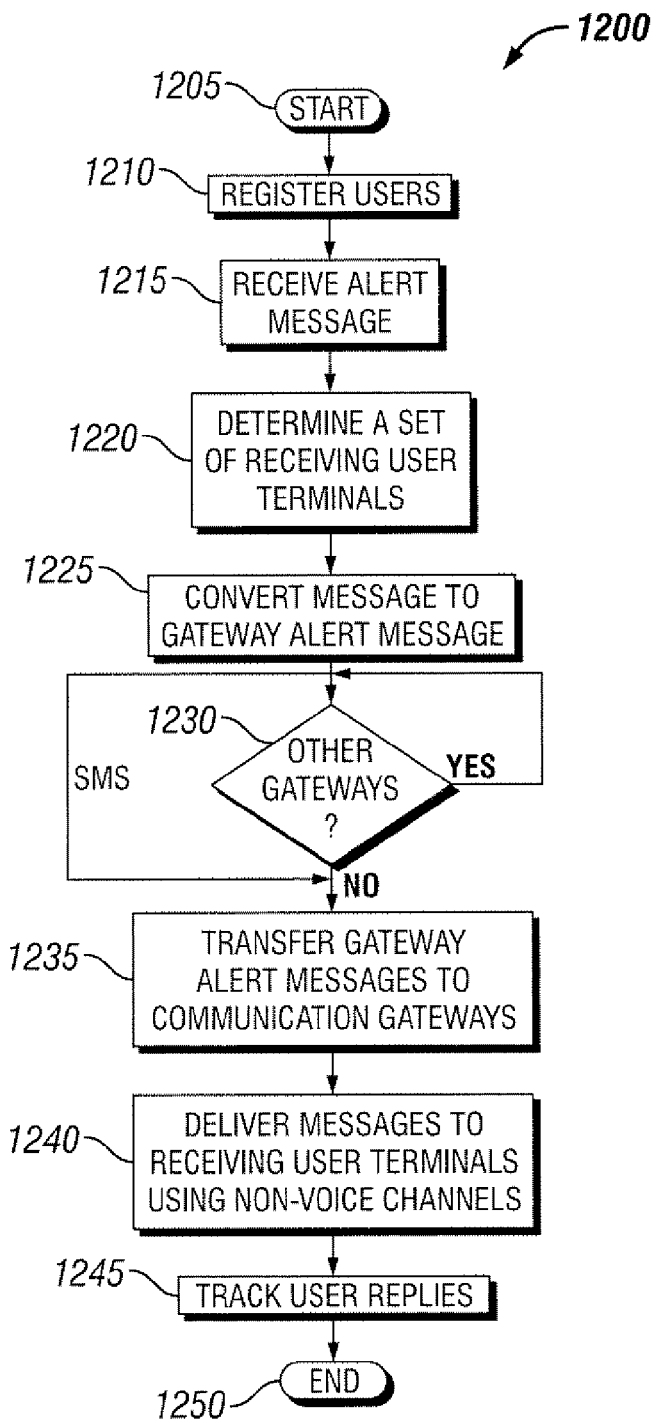
FIG. 12 is a flow chart of a method according to at least one embodiment.

A method 1200 according to at least one embodiment is shown in the flow chart of FIG. 12. Referring to FIG. 12, a method 1200 may commence at 1205 and proceed to 1210, at which a method may include registering a plurality of users to receive messages from at least one alert originator. Control may then proceed to 1215, at which a method may enter a state awaiting reception of an alert message from an alert originator. Upon receiving an alert message from an alert originator, control may proceed to 1220 in which a method may include determining a set of user terminals to receive a user alert message corresponding to the received alert message. In at least one embodiment, the set of user terminals may be associated with the registered users of at least one message recipient group.

Control may then proceed to 1225, in which a method may include converting the alert message to one or more gateway alert messages. Alternatively, for SMS received alert messages, conversion at 1225 may be bypassed and the SMS message output as a gateway alert message. In an embodiment, this may be accomplished by transferring the first message received from an alert originator to an SMS or priority gateway for distribution of the SMS message to user terminals. An example of an SMS gateway is the Bunny Hop™ Short Message Servicing Center (SMSC) product provided by TeleCommunications Systems, Inc. of Annapolis, Md. In either case, control may then proceed to 1230, at which a method may conditionally determine whether or not another gateway alert message is to be prepared. If so, control may return to 1225 for conversion. If not (e.g., there are no more gateway alert messages to be prepared), control may then proceed to 1235. At 1235, a method may include transferring each of the gateway alert messages to its corresponding communication gateway. Control may then proceed to 1240, at which a method may include distributing or delivering an alert message by the communication gateways, upon their receiving a gateway alert message, to each of the registered users associated with the at least one message group. In at least one embodiment, the transfer may be performed using a non-voice channel of the communication network. Control may then proceed to 1245, at which a method may include tracking replies received from each user in response to the alert message(s) received by the user. Control may then proceed to 1250, at which a method may end.

Figure 13:
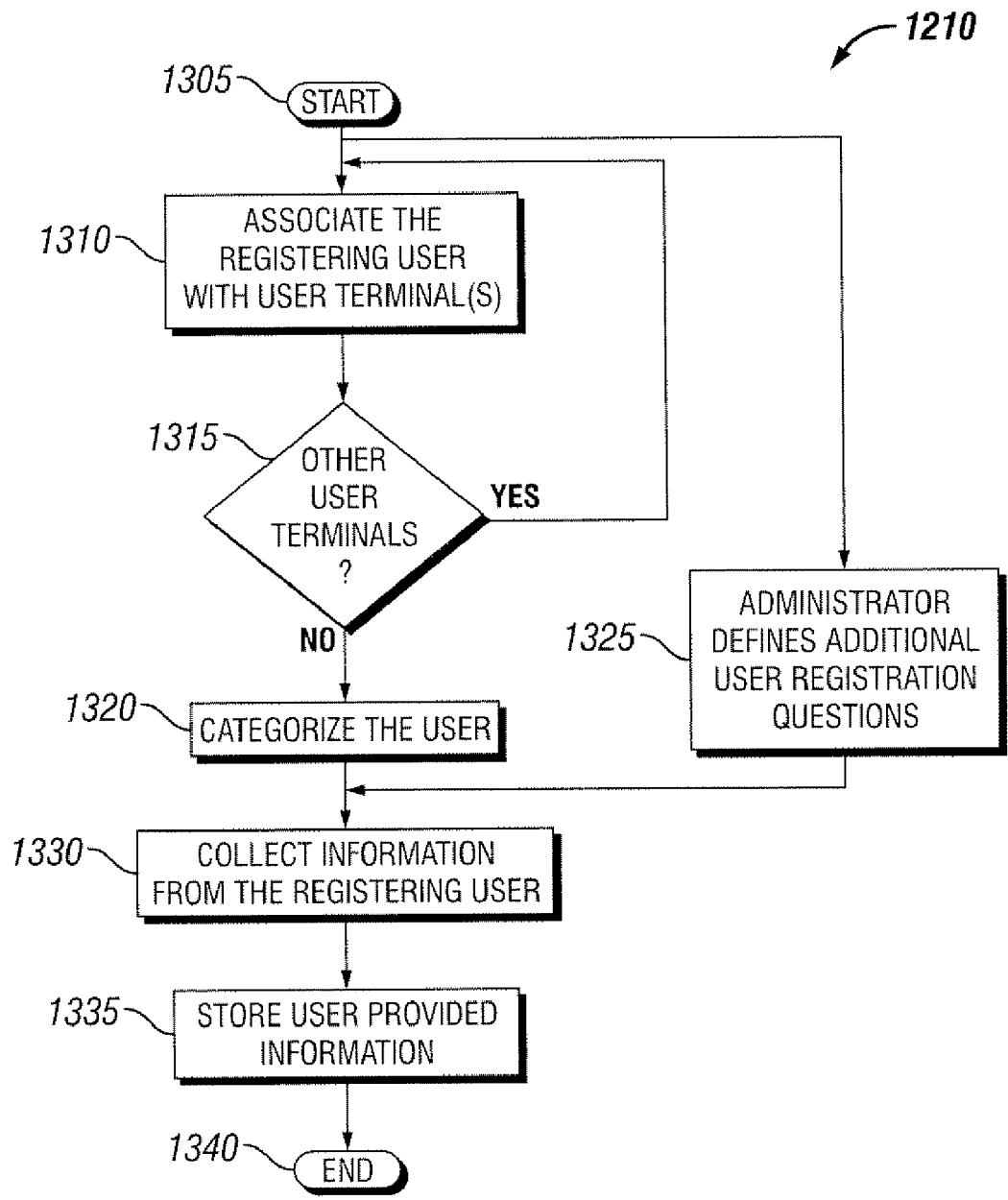
FIG. 13 is a flow chart showing further detail regarding registration of users according to an embodiment.

Further detail regarding registration of users per 1210 is shown in FIG. 13. Referring now to FIG. 13, registration 1210 in at least one embodiment, may further commence at 1305 and proceed to 1310, at which registration may include associating each registered user with a user terminal. Further, control may also proceed to 1325, at which an administrator may define and add additional questions designed to obtain particular information from users during the registration process. Control may then proceed to 1315, at which a registration method may include conditionally determining whether another user terminal should be associated with the user. If so, then control may return to 1310. If not (i.e., no further user terminals to be associated with the user), then control may proceed to 1320. At 1320, the registration method may include categorizing the user. In at least one embodiment, the registering user may be registered as one of an administrator, a manager, or a non-originating user. Control may then proceed to 1330, at which a registration method may include collecting information from the registering user. In an embodiment, user information may be collected using an interactive page such as, for example, a World Wide Web page, which includes data fields in which the registering user may enter information in response to corresponding questions provided on the page. In an embodiment, the questions on the registration page may be previously defined by an administrative user. The user provided information may then be stored in a database, at 1335. Control may then proceed to 1340, at which a registration method may end. An illustration of an example registration page 800 provided in conjunction with registration 1210 is shown in FIGS. 8a and 8b.

Figure 15:
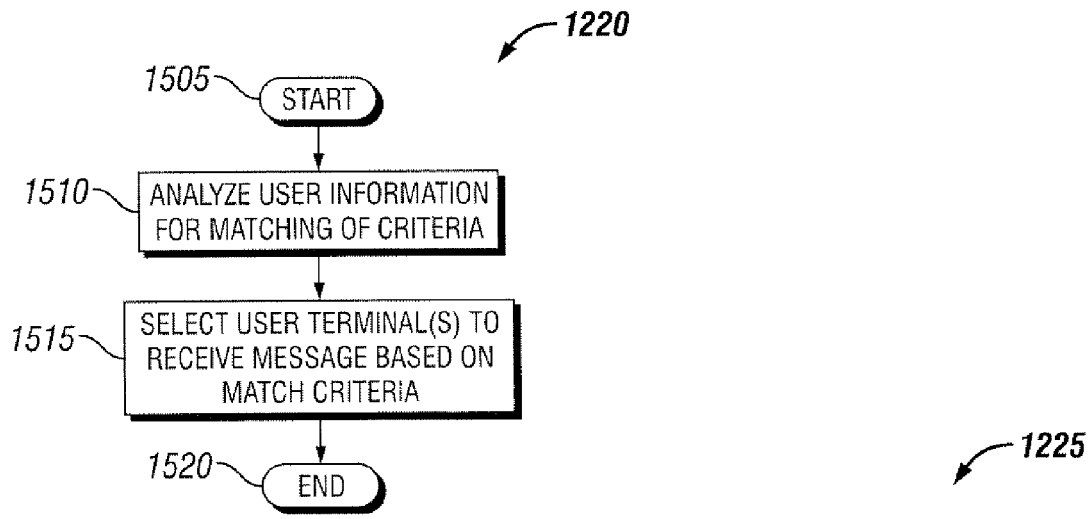
FIG. 15 is a flow chart showing further detail regarding determining a set of receiving users according to an embodiment.

Further detail regarding determining a set of receiving user terminals per 1220 is shown in FIG. 15. Referring to FIG. 14, determining a set of receiving user terminals may, in at least one embodiment, commence at 1505 and proceed to 1510. At 1510, a determining method may include analyzing the collected user information for the presence of one or more particular informational items based on criteria selected by the alert originator. For example, an alert originator may wish to send an alert message to all registered users in a group that speak Spanish. During registration, the capability may be provided for the user to specify in which language(s) she wants to receive messages on her devices. Further, the user may specify during registration the language in which he wishes to interact with the registration page and enter user information. Control may then proceed to 1515, at which a determining method may include selecting the group of user terminals based on the users associated with the user terminals whose user information matches the criteria specified in the analyzing (for example, users whose information indicates that he speaks Spanish). Control may then proceed to 1520, at which a determination method may end.

Figure 16:
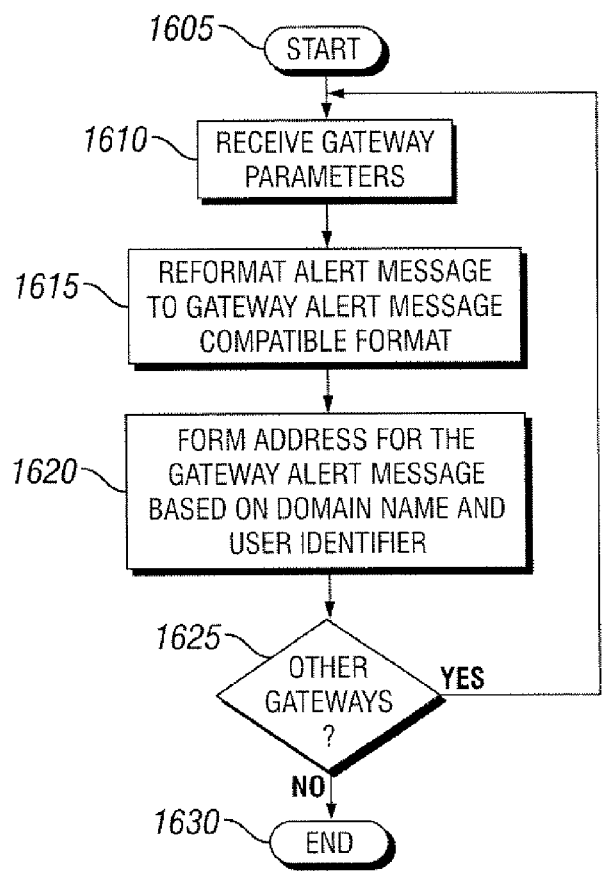
FIG. 16 is a flow chart showing further detail regarding converting an alert message to a gateway message according to an embodiment.

Further detail regarding converting an alert message to a gateway alert message per 1225 is shown in FIG. 16. Referring to FIG. 16, converting a message to a gateway alert message may, in at least one embodiment, commence at 1605 and proceed to 1610. At 1610, a converting method may include retrieving parameters from a database that are associated with the communication gateway to which the gateway alert message is intended. Such parameters may include the maximum word length, header information, routing information, and other information particular to the communication gateway and its network. In at least one embodiment, the database 303 may include an optimum number of characters for the message based on the memory and display capacity of the user terminal 105. For example, a message destined for a wireless terminal such as a cell phone handset with a Liquid Crystal Display (LCD) may be limited to 40 characters maximum. Furthermore, the information may include a specification of the maximum number of characters for the gateway alert message specifically chosen for maximum likelihood of message delivery by the network 107 to the user terminal 105 based on, for example, historical data characterizing network traffic reliability. Control may then proceed to 1615, at which the converting method may include reformatting the received alert message (for each gateway alert message to be provided), the alert message received from the alert originator to a format in which the communication gateway associated with the gateway alert message will accept and perform operations in response to the incoming gateway alert message. Control may then proceed to 1620, at which a converting method may include forming an address for each of the gateway alert messages to include the domain name information associated with the communication gateway and the user identification information associated with the registered user receiving the alert message (e.g., user_name@verizon.net). In at least one embodiment, forming an address may also include forming a pager address by entering a ten digit telephone number. In an embodiment, forming an address may include appending a suffix to an electronic mail address or IP socket that specifies a fast route through the network 107, for increased speed in alert message delivery to user terminals 105. For example, the address suffix may specify a particular access point or IP socket within the network 107 bypassing one or more routing points in the network 107, for faster message routing and delivery. During registration, the user may also be prompted to enter the identifier for his device. The user's entry may be validated by the system, and if the entered number does not match an expected format (stored using a database 303), the messaging subsystem 101 may select the associated carrier's standard prefix and suffix. If this results in a valid address, then this address is used by the system. If not, the user may be prompted to edit his entry. If necessary, the messaging subsystem 101 may also append a prefix to the device access number (e.g., "<prefix>.<cell phone number>@<domain name>"). Control may then proceed to 1625, at which the converting method may include determining if another gateway alert message is to be prepared. If so, control may return to 1610. If not, then control may proceed to 1630, at which a converting method may end. Because the networks 107, user terminals 105, and communication gateways 104 may be different, any one of the gateway alert messages may be formatted differently than one or more other gateway alert message. An example GUI interactive delivery channels page 1700 which may be used to configure delivery channel settings is shown in FIG. 17. These settings are automatically applied to a device based on the carrier a user chooses when creating it, such as during registration 802. Referring to FIG. 17, Delivery Channel Name 1301 may output the name assigned to the delivery channel. Character Limit Per Message 1302 may output the number of characters for that delivery channel, beyond which a message must be sent in multiple parts. Delivery Method 1303 may output the protocol used to deliver a message to this delivery channel. Automatic Prefix 1304 may output any information that must be added in front of a delivery channel address. Automatic Suffix 1305 may output the delivery channel address suffix. Class 1306 may output the channel type, e.g. email, cell phone, pager, desktop alerts, instant message, SMS, etc. Comment 1307 may output any pertinent information an Administrator wishes to add.

Furthermore, the transferring of gateway alert messages may also include prioritizing the order in which each gateway alert message is transferred according to communication gateway characteristics. In an embodiment, outgoing messages may be grouped by delivery method and by a domain name within a delivery method. For example, an administrator may specify a particular order in which the messaging subsystem transfers or sends each of the gateway alert messages to the respective communications gateway. Alternatively, the messaging subsystem may transfer gateway alert messages in a predefined order. Furthermore, the order in which particular users receive alert messages may be prioritized by the administrator. The order may be stored in a database. For example, the messaging subsystem may transfer messages to users based on the group or organization with which they are associated, or other user specific information, as entered during registration. Furthermore, a sender is provided the capability to select and transfer messages to users individually. In an embodiment, gateway alert messages may cause the network to disseminate alert messages to user terminals via, for example, but not limited to, electronic mail per SMTP, interactive World Wide Web pages per HTML or XML, and short text messages per SMS or IM. In at least one embodiment, the messaging subsystem may cause the communication gateway to output one or more HTML or XML popup screens that, when received by the user terminal, appear at the top level (i.e., take over the screen) of the user terminal display. An example of such a popup message service is the "e/pop" service available from WiredRed Software of San Diego, Calif., or CENS. Such popup messages may include visual and audio effects.

In at least one embodiment, to send an alert message, authorized users may send an authenticated and/or encrypted e-mail directly to the messaging subsystem, log on to a secure capable web page to fill out a web form of the alert message, and send an authenticated wireless text message.

An alert originator may send an alert message to a group of users by different methods. First, an alert originator may send an alert message via web interface. Second, an alert message may be sent via external trigger (e.g., incoming email, other incoming data stream from a partner system).

Figure 18A:
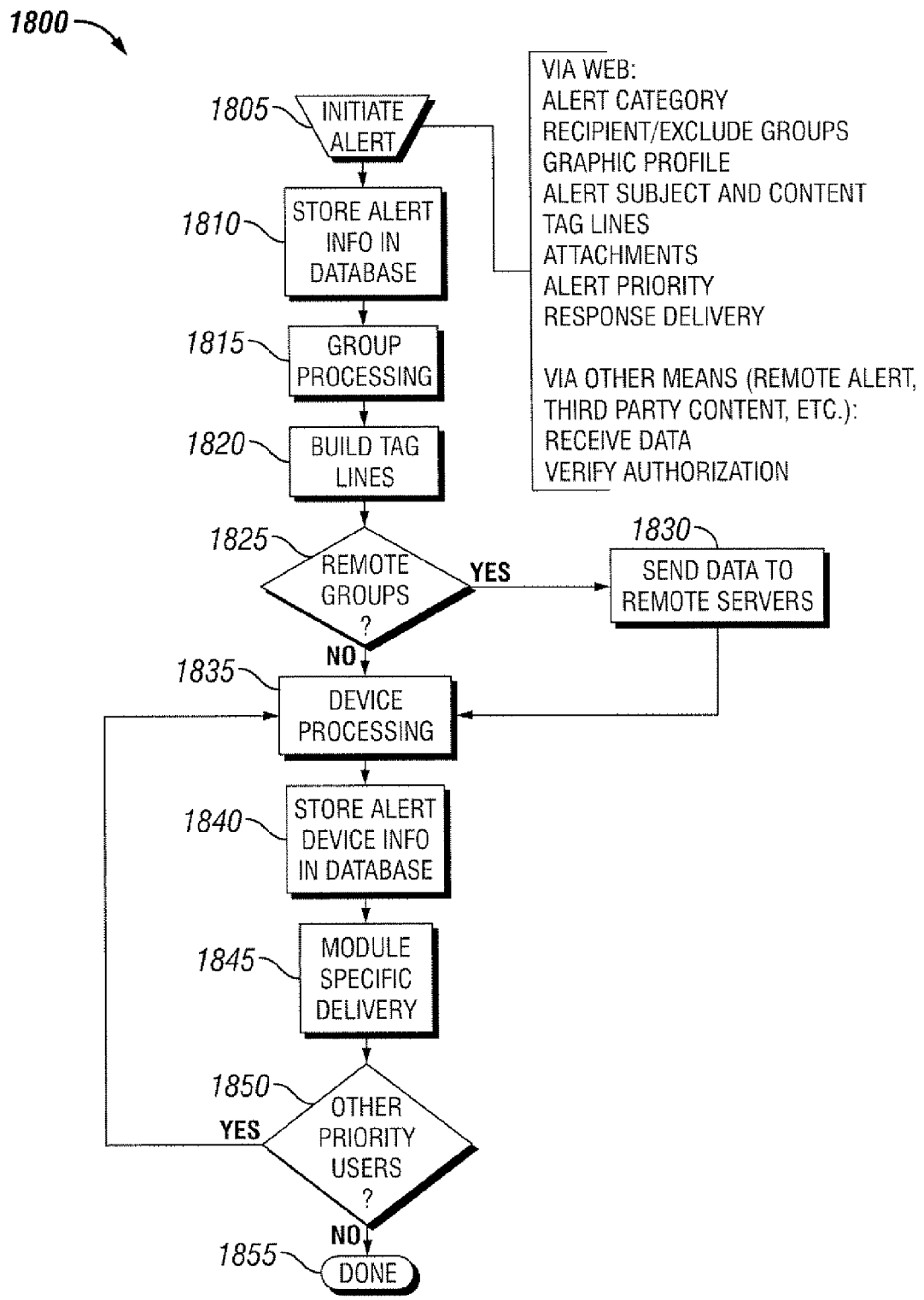
FIGS. 18a through 18c are flow charts of a detailed messaging method according to an embodiment.

A flowchart of a detailed messaging method 1800 is shown in FIG. 18a. Referring to FIG. 18a, in at least one embodiment, a messaging method may include a sender initiating a message, which may be an alert, at 1805. To initiate a message, a sender may send via web interface to the messaging subsystem 101a request for an interactive page. Upon receiving the request, the messaging subsystem may render and transfer to the sender an interactive page, which may be, for example, a World Wide Web page formatted in accordance with HTML or XML. Upon receiving the interactive page, the sender's terminal, which may be a user terminal 105, for example, may output the interactive page to the sender to allow the sender to select and enter and otherwise define various parameters associated with the message by interacting with data entry/selection fields on the interactive page provided by the messaging subsystem 101 for this purpose. For example, the sender may select properties of the message, including, but not limited to, Alert Category (e.g., weather, traffic, . . . ), Recipient groups (standard groups and/or individual users via custom group), Excluded groups (groups of users who should not be receiving this alert or message), Graphic profile (the receiving devices will take advantage of suggested coloring scheme, font styles and other formatting to the extent of their capabilities, (e.g., no formatting for cell phones, full formatting for instant messaging clients), Subject and Content of the alert or message (either one shared by all categories of devices, such as cell phones, pagers, email accounts, or each category of devices can have a different content), Tag lines for each device class (e.g., 'Sent by John Smith to Group A, Group B . . . '), Attachments (files, pre-defined responses, timestamps, etc—only the devices that can handle will benefit, e.g., cell phones will get no file attachments, etc), Priority of message (e.g., high/normal, which may affect visualization of the alert depending on the delivery target), and Forwarding of responses (e.g., have the system forward recipients' responses to specified email address(es)). As explained herein, these properties can also be prepopulated via a quick alert in which a message can be sent as defined in quick alert or the quick alert can be used as a template where blanks are filled prior to sending. Furthermore, during the building of a message, a sender may enter a different sending address prefix or different message subject to reflect a different alert originator or originating organization.

After selecting and entering the message information, the alert originator 102 (sender) may initiate transfer of the message to the messaging subsystem 101 by selecting, for example, a "send" button on the interactive page using a computer mouse or keypad. At this point, control may proceed to 1810 at which the web server 302 (which may be, in at least one embodiment, a PHP web page processor) may store the collected information selected or entered by the sender. In an embodiment, the collected information is stored into the database 303. Further, the web server 302 may also copy members of current custom group to individual alert recipients and trigger the send alert function of the message engine 301.

As described earlier, alternatively the alert originator 102 may select, build, and send a message using a variety of communication devices including, but not limited to, a web-enabled mobile telephone terminal, SMTP formatted electronic mail, SMS, Instant Message, Blackberry™ message, or any other such device configured to generate similar non-voice messages, such as text messages or telemetry data.

Furthermore, in an embodiment, the alert originator 102 may send a message via external trigger mechanism such as, for example, a remote sensor that includes a communication interface for reporting event status. Such a device may have, for example, an SMS message processor configured to transmit an SMS message to another device upon the occurrence of a particular event such as, for example, a utility meter remote reading device. Embodiments may include other industrial control applications and devices that generate messages as the alert originator 102. In such embodiments, the web server 302 may receive an alert-triggering data stream, and perform message processing functions in response thereto including message decode, identify individual parameters of the alert, and use of default values for those not included. Further, if the external data stream refers to a quick alert, the web server 302 may populate a message using predefined parameters stored in the database 303 associated with the particular quick alert. In addition, the web server 302 may confirm authorizations of the entity (sender or device) that delivered the data stream for sending alerts with these properties. Finally, the web server 302 may submit the message or alert for delivery to the message engine 301.

Control may then proceed to 1815, at which the message engine 301 may perform group processing as follows. First, the message engine may fetch the message or alert specification as created by one of the above steps from the database 303. Next, the message engine 301 may expand the list of explicitly listed destination groups and excluded groups with all their subgroups.

Control may then proceed to 1820, at which the message engine 301 may build tag lines from the information provided according to the specified tag line format for each carrier class. Furthermore, the message engine 301 may bundle all alert-defining data into a single data structure. At 1825, a method may include determining if any destination groups are 'remote groups.' If so, control may proceed to 1830 at which the message engine 301 may submit the alert definition into the corresponding remote servers.

Following 1825 or 1830, control may proceed to 1835, at which the message engine 301 may perform device specific processing for message delivery to multiple user terminals or devices. In an embodiment, the message engine 301 may perform device specific processing for each user priority level separately. In at least one embodiment priority level processing may proceed from highest priority to lowest priority. Further details regarding device specific processing at 1835 are shown and described herein with respect to FIG. 18*b*.

Figure 18B:
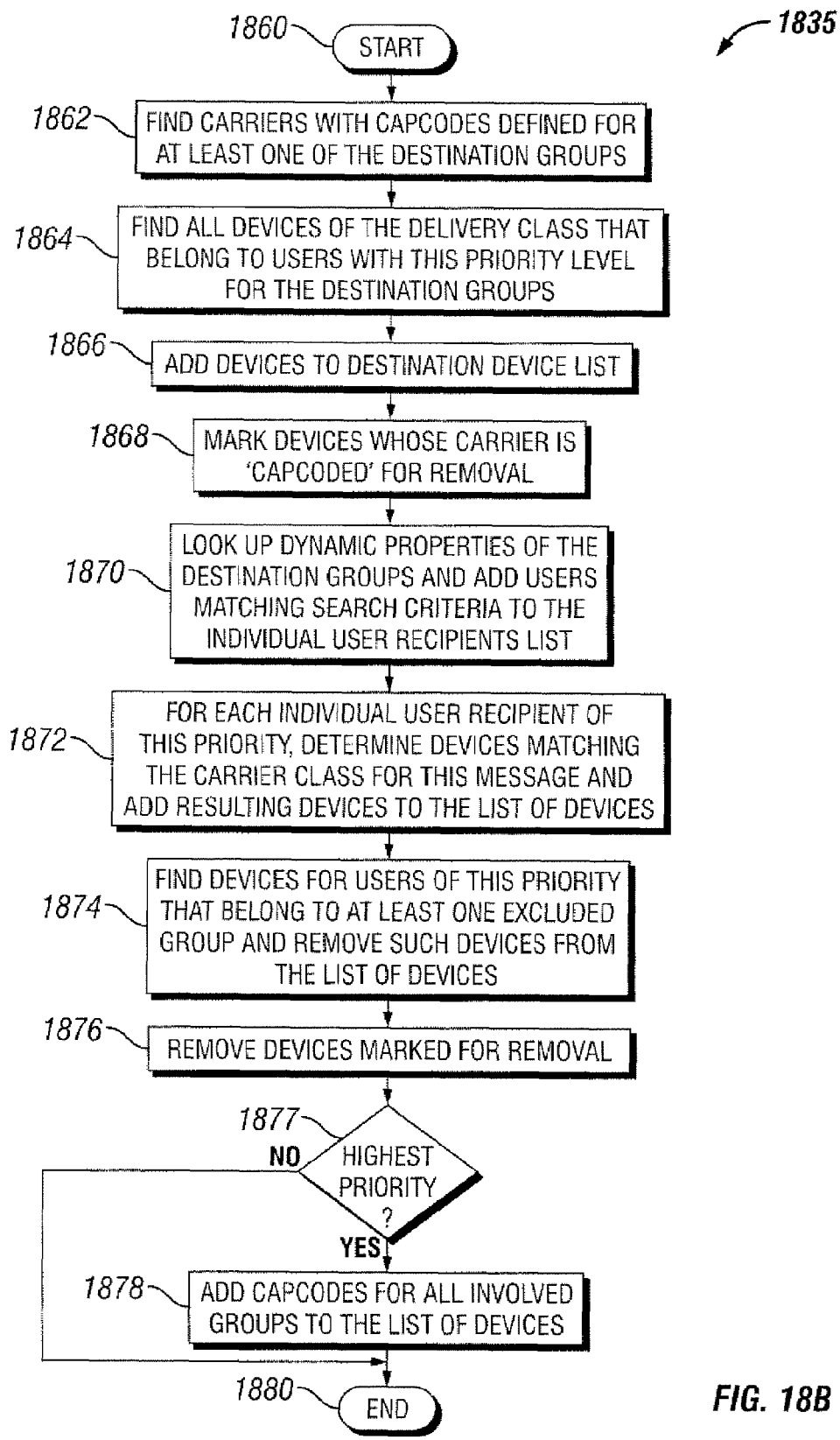

Referring to FIG. 18*b*, in at least one embodiment device specific processing 1835 may commence at 1860. Control may then proceed to 1862, at which the message engine may find carriers that have capcodes defined for at least one of the destination groups identified to receive the message (i.e., capcoded carriers). A capcode may be a unique address or identifier associated with a particular device or user terminal.

Control may then proceed to 1864, at which the message engine may find all devices of delivery class this message or alert is supposed to go to that belong to users with the currently processed level of priority that belong to at least one of the destination groups of this alert, and add to list of devices. Control may then proceed to 1866, at which the message engine may add all these devices into a destination device list. Control may then proceed to 1868, at which the message engine may mark all devices whose carrier is 'capcoded' for removal later. Control may then proceed to 1870, at which the message engine may look up dynamic properties of the destination groups and add all users that match these search criteria into the individual user recipients list. Control may then proceed to 1872, at which for each individual user recipient of the currently processed user priority, the message engine may look up all their devices that match the carrier class used for his alert, and add resulting devices to the list of devices, Control may then proceed to 1874, at which the message engine may find devices of all users (of current priority) that belong to at least one excluded group, and remove such devices from the list of devices. Control may then proceed to 1876, at which the message engine may remove all devices that were marked for removal earlier (due to capcodes). If this is the highest priority loop, then control may proceed to 1878, at which the message engine may add capcodes for all involved groups into the list of devices. Control may then proceed to 1880, at which device specific processing 1835 may end.

Returning to FIG. 18*a*, wherein following device specific processing at 1835, if this is a local message such as a local alert (i.e., not a remote alert), the message engine may store all the collected information in the database 303 for alert tracking and reporting purposes. Control may then proceed to 1840, at which the message engine may execute message delivery. In at least one embodiment, for each different delivery module (i.e., delivery via email, instant messaging, voice call, etc.), the message engine may load the code responsible for delivering through this method and launch the code with the message or alert information and the list of devices to be handled by this module. Control may then proceed to 1850, at which a method may include repeating 1835 through 1850 for the next user priority level. In at least one embodiment, the messaging subsystem 101 may include one or more message delivery modules for delivering messages via particular communications interface and medium such as, for example, electronic mail (email), paging, cell phone, SMS, and the like.

Figure 18C:
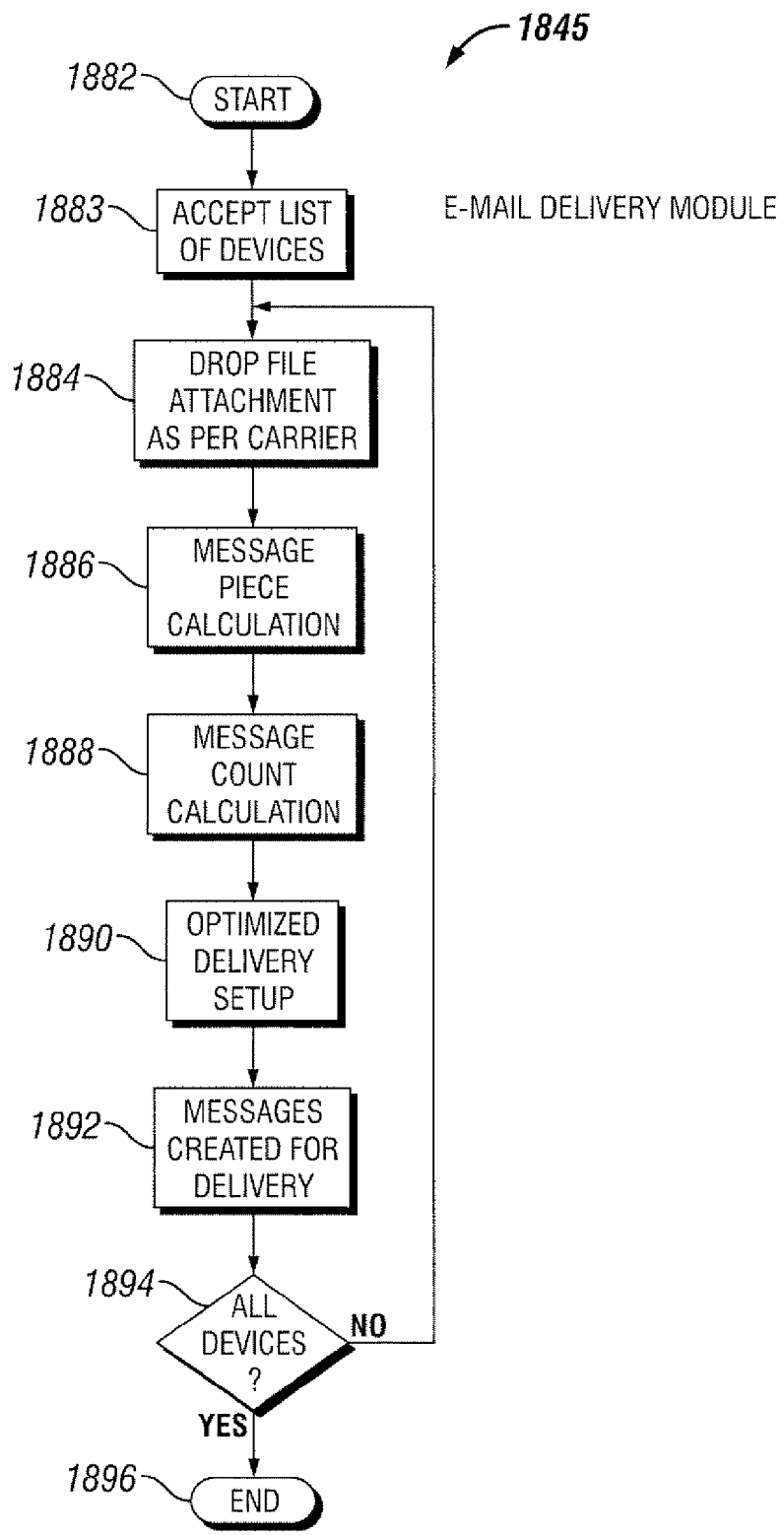

Further details regarding module specific delivery 1845 are shown and discussed with respect to FIG. 18*c*. Referring to FIG. 18*c*, in at least one embodiment, the message engine may 301 may include a mail processor 304 that may be configured to support email delivery (e.g., an email delivery module) commencing at 1882. Control may then proceed to 1883, at which the mail processor may accept a list of devices to deliver messages to. In an embodiment, the dispatcher may only provide those that apply to this module, not for all possible devices). For each Delivery Method handled by this module (for example, delivery methods "AT&T" and "Cingular" under module 'SMS delivery'), the mail processor may perform 1884 through 1894.

Following 1883, control may proceed to 1884, at which the mail processor may drop file attachments if this is a limited message length delivery method. Control may then proceed to 1886, at which the mail processor may calculate how many pieces this alert needs to go out in for this delivery method (for example, using the maximum number of characters per message info associated with this delivery method). Control may then proceed to 1888, at which for each email piece the mail processor may generate the message content of that piece and store it in, for example, local non-volatile memory such as a hard disk. Control may then proceed to 1890, at which the mail processor may calculate how many individual emails will be sent using the information about the number of pieces necessary and number of devices targeted and considering also how many devices can be bundled together in a single email. Further, at 1890, the mail processor may calculate, given the number of available parallel delivery processes (buckets), how many emails to put to each bucket to distribute the load evenly across them. Control may then proceed to 1892, at which the mail processor may generate headers for each outgoing email (put the same number of emails into each bucket) using the list of devices, bundle devices with the same email domain (destination server) together to minimize the number of outgoing connections, link the body of the email generated above with this header (note that each body is shared by many headers thus making this process more efficient) and, after both header and body of the message is created, providing the email ready to be fetched by the delivery daemon. For each bucket, there may be several delivery daemons that are monitoring the bucket looking for any new messages submitted there for delivery. When these daemons find any such message, they identify the recipients and initiate SMTP connections with the destination servers. Control may then proceed to 1894, at which a method may include repeating 1884 through 1894 until messages for all devices have been delivered.

Figure 19:
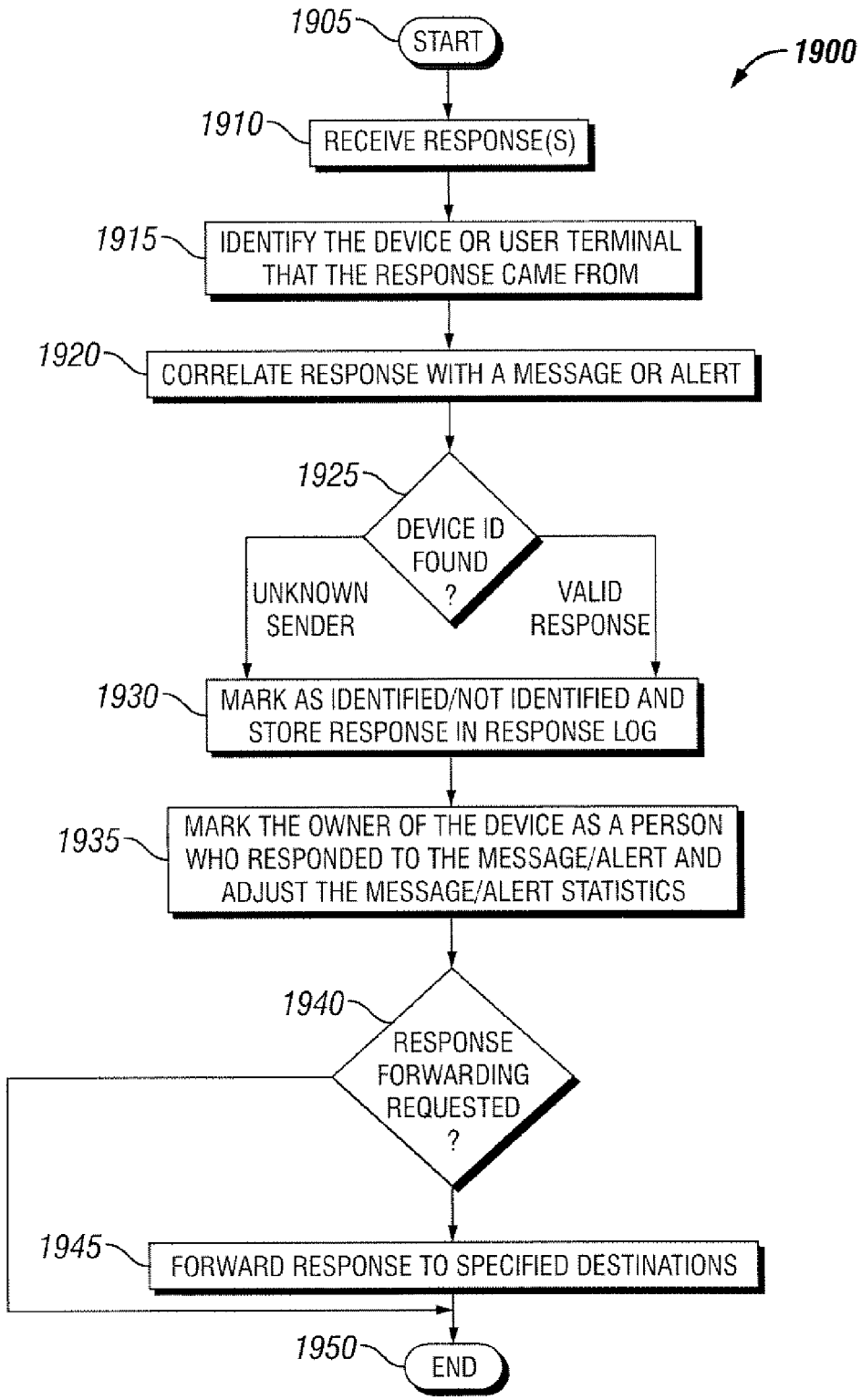
FIG. 19 is a flow chart of a method of response tracking according to at least one embodiment.

Furthermore, at least one embodiment may include a response handling method for tracking responses to delivered messages following message transfer and delivery as shown and described with respect to FIGS. 18*a-c* above. In particular, FIG. 19 is a flow chart of a method 1900 of response tracking in accordance with at least one embodiment. Referring to FIG. 19, a response handling method 1900 may commence at 1905. Control may then proceed to 1910, at which the message engine may receive one or more responses from user terminals via communication channels (e.g., via email, via other channels). For each received response, the message engine may process the response as follows. Control may then proceed to 1915, at which the message engine may identify the device or user terminal that the response came from (sender's email address, instant message client identifier, other ID). Control may then proceed to 1920, at which the message engine may identify which message or alert this is a response for (i.e., correlate response with message/alert). Control may then proceed to 1925, at which the message engine may look for this identifier in a device table. If found, the message engine may determine that this message is a valid response from a device that received the alert. If not found, the message engine may determine that the response came back from an unknown sender. This may occur, for example, due to the message or alert having been sent to an invalid destination and this is a bounced message (e.g., sent by a remote server telling the messaging subsystem the destination (email account, cell phone, etc.) doesn't exist). In both cases, control may then proceed to 1930 at which the message engine may store the response in a response log for the given message or alert but mark the response as either identified or other. Control may then proceed to 1935 if the response is identified, at which the message engine may mark the owner of the device as a person who responded to the message/alert and adjust the message/alert statistics accordingly. Control may then proceed to 1940, at which if the sender of this alert requested responses to be forwarded, the message processor may forward the response to specified destinations at 1945. Control may then proceed to 1950, at which a method may end. Furthermore, in at least one embodiment, an auto-scrubber capability may be provided to automatically remove bounced addresses from reply tracking.

In at least one embodiment, the messaging subsystem may include several predefined quick alert messages. Examples of user selectable icons for exemplary quick alerts is shown in FIG. 10. Referring to FIG. 10, quick alerts may include Bio Attack, Dirty Bomb, Earthquake, and Mass Casualty Incident, as a minimum. In an embodiment, an administrative user may initiate a quick alert by selecting an icon corresponding to the desired quick alert message by, for example, clicking on the icon with a computer mouse. Upon administrative user selection of a quick alert message, the messaging subsystem 101 may retrieve predefined alert message text from a database, assemble one or more gateway alert messages as specified in the database, and transfer the gateway alert message(s) to a predefined set of communication gateways, with no further user involvement. In an embodiment, in order to send a quick alert, no PIN code may be required.

In at least one embodiment, users may interact with the messaging subsystem 101 via the web server 302. To access the web server 302, in an embodiment, a user may enter the URL associated with a web server 302 of the messaging subsystem 101 into the address line of a World Wide Web browser application. Alternatively, a user may select an associated hyperlink contained on an interactive page using a pointing device such as a mouse or via keyboard commands. This causes an HTTP-formatted electronic message to be transmitted to the web server 302 (after Internet domain name translation to the proper IP address by an Internet proxy server) requesting a HTML or XML page. In response, the web server 302 generates and transmits a corresponding interactive HTTP-formatted HTML or XML page to the requesting terminal, and establishes a session. The HTML or XML page may include data entry fields in which a user may enter information such as the client's identification information, contact information, etc. The user may enter the prompted information into the appropriate data entry fields of the HTML or XML page and cause the terminal to transmit the entered information via interactive HTML or XML page to the web server 302. In response to receiving the user transmitted page populated with user provided information, the web server 302 may validate the received information by comparing the information received to corresponding stored data. This validation may be requested by the web server 302 to be performed by a database server by executing one or more validation scripts. If the database server 302 determines that the information is valid, or in response to an entry request, then the web server 302 may generate and transmit a report page to a terminal. In this way, page content for pages provided by the web server 302 may be dynamic, while page frames may be statically defined. The dynamic and static information may be included in a database.

Thus, the systems and methods of the embodiments described herein may provide to emergency management agencies, first responders, government, near government and educational organizations and businesses the ability to communicate to large groups of individuals quickly and reliably when other means of communication such as, for example, land voice lines, cell voice communication, corporate e-mail are down or otherwise not available. In particular, such embodiments may provide the capability for individuals and groups to be notified of emergency situations through the delivery of text messages. Such messages may also describe the nature of the emergency, recommend next steps, and provide situation updates. Furthermore, the systems and methods may also be used for non-emergency daily communication to reach large numbers of users. In addition, the systems and methods may include multiple interconnected messaging subsystems in a message processing network in which authorized senders of one messaging subsystem at a first messaging center can send alerts and notifications to users other messaging subsystems at other messaging centers.

While embodiments of the invention have been described above, it is evident that many alternatives, modifications and variations will be apparent to those skilled in the art. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents.

We claim:

1. A communication method comprising:
registering a plurality of users for receiving messages;
determining, in response to receiving a first message from at least one alert originator, one or more user terminals to receive a second message corresponding to the received first message, each of the one or more user terminals being associated with at least one registered user;
converting the first message to one or more gateway messages; and
transferring each of the one or more gateway messages to one or more corresponding communication gateways for distribution of the second message by the one or more communication gateways to each of the registered users associated with at least one message group, wherein the transfer is performed using a non-voice channel;
wherein converting further comprises reformatting, for each of the one or more gateway messages, the first message received from the alert originator to a format in which the communication gateway associated with the gateway message will accept and perform operations in response to the incoming gateway message and forming an address for each of the one or more gateway messages to include the domain name information associated with the communication gateway or the user identification information associated with the registered user receiving the second message.

2. The communication method of claim 1, in which the registering further comprises:
categorizing each registered user according to one of an administrator, a manager, and a non-originating user;
collecting information from each user in response to questions defined by an administrator associated with the message group; and
storing the collected user information in a database.

3. The communication method of claim 2, in which the determining further comprises:
analyzing the collected user information for the presence of one or more particular informational items based on criteria selected by the at least one alert originator; and
selecting the group of user terminals based on the users associated with the user terminals whose user information matches the criteria specified in the analyzing.

4. The communication method of claim 1, wherein at least one of the communication gateways requires a different format for the received gateway message than the format for gateway messages for every other communication gateway.

5. The communication method of claim 1, in which at least one communication gateway is associated with wireless service provider.

6. The communication method of claim 1, in which the transferring further comprises prioritizing the order in which each gateway message is transferred according to communication gateway characteristics.

7. The communication method of claim 6, in which the gateway characteristics include at least one of a common domain name and a particular communications medium.

8. The communication method of claim 1, in which the elapsed time from the first message being initiated by the alert originator to the time that at least one intended user terminal receives a corresponding second message is within two seconds.

9. The communication method of claim 1, in which the non-voice channel is a data channel.

10. The communication method of claim 1, in which the non-voice channel is a control channel.

11. The communication method of claim 1, further comprising tracking replies received from the registered users via the communication gateway confirming at least user terminal receipt of the second message.

12. A communication system comprising:
a first messaging subsystem which may be coupled to an alert originator and to one or more communication gateways, wherein each of the gateways is also coupled to at least one user terminal, and wherein the first messaging subsystem associates a unique set of message parameters with each of the communication gateways;
wherein the first messaging subsystem is configured to transmit at least one gateway message to a plurality of the user terminals via the one or more communication gateways, in accordance with each set of the unique message parameters for each communication gateway, upon receiving a first message from the alert originator;
wherein the first messaging subsystem is configured to reformat, for each of the one or more gateway messages, the first message received from the alert originator to a format in which the communication gateway associated with the gateway message will accept and perform operations in response to the incoming gateway message; and
wherein the first messaging subsystem is configured to form an address for each of the one or more gateway messages to include the domain name information associated with the communication gateway or the user identification information associated with the registered user receiving the second message.

13. The communication system of claim 12, wherein the first messaging subsystem includes at least one message engine.

14. The communication system of claim 13, wherein the messaging subsystem includes at least one web server and a database coupled to the at least one messaging engine.

15. The communication system of claim 12, wherein the messaging subsystem further includes user information collecting means for obtaining a plurality of informational items for each user, wherein the user information collecting means is configured to collect each of a set of informational items defined by an administrator.

16. The communication system of claim 12, wherein each of the user terminals is associated with at least one message group and in which each of the user terminals associated with each message group is further associated with one of an administrator, a manager, and a non-originating user for the message group.

17. The communication system of claim 12, in which the elapsed time from the first message being initiated by the alert originator to the time that at least one intended user terminal receives a corresponding second message is within two seconds.

18. The communication system of claim 12, further comprising at least a second messaging subsystem coupled to the first messaging subsystem, wherein the first and second messaging subsystems are configured to provide message transfers between the user terminals of a first message group and the user terminals of a second message group.

* * * * *

UNITED STATES PATENT AND TRADEMARK OFFICE
CERTIFICATE OF CORRECTION

PATENT NO.        : 7,409,428 B1                              Page 1 of 1
APPLICATION NO.   : 10/829181
DATED             : August 5, 2008
INVENTOR(S)       : Frantisek Brabec et al.

It is certified that error appears in the above-identified patent and that said Letters Patent is hereby corrected as shown below:

Column 29:
Line 43, delete "the" preceding "domain"
Line 44, delete "the" preceding "user"

Column 30:
Line 46, delete "the" preceding "domain"
Line 47, delete "the" preceding "user"
Line 48, replace "the registered user" with "a registered user"
Line 49, replace "the second message" with "a second message"

Signed and Sealed this
Thirty-first Day of January, 2012

David J. Kappos
*Director of the United States Patent and Trademark Office*

US007409428C1

(12) INTER PARTES REEXAMINATION CERTIFICATE (982nd)
United States Patent
Brabec et al.

(10) Number: US 7,409,428 C1
(45) Certificate Issued: Oct. 29, 2014

(54) SYSTEMS AND METHODS FOR MESSAGING TO MULTIPLE GATEWAYS

(75) Inventors: Frantisek Brabec, North Potomac, MD (US); David R. Drescher, Arlington, VA (US); Daniel A. Gadra, Arlington, VA (US); Daniel D. Park, Arlington, VA (US); Richard A. Tiene, Arlington, VA (US)

(73) Assignee: Cooper Notification, Inc., Long Branch, NJ (US)

Reexamination Request:
No. 95/001,425, Aug. 26, 2010

Reexamination Certificate for:
Patent No.: 7,409,428
Issued: Aug. 5, 2008
Appl. No.: 10/829,181
Filed: Apr. 22, 2004

Certificate of Correction issued Jan. 31, 2012

Related U.S. Application Data

(60) Provisional application No. 60/514,873, filed on Oct. 29, 2003, provisional application No. 60/320,133, filed on Apr. 22, 2003.

(51) Int. Cl.
G06F 15/16 (2006.01)

(52) U.S. Cl.
USPC ........... 709/206; 709/205; 709/207; 709/230; 709/246; 709/248

(58) Field of Classification Search
None
See application file for complete search history.

(56) References Cited

To view the complete listing of prior art documents cited during the proceeding for Reexamination Control Number 95/001,425, please refer to the USPTO's public Patent Application Information Retrieval (PAIR) system under the Display References tab.

*Primary Examiner* — Charles Craver

(57) ABSTRACT

Systems and methods for providing message communication among multiple communication gateways. In particular, systems and methods for providing non-voice message delivery to intended recipients with increased speed and reliability to multiple users on multiple platforms. The systems and methods relate to non-voice messaging to multiple messaging gateways. In at least one embodiment, the systems and methods include Internet based electronic messaging using a messaging subsystem configured to optimize text message delivery to communication gateways.

Attention is directed to the decision of *Cooper Notification Inc* v. *Twitter Inc et al*, U.S. District-Delaware (Wilmington) 1:09cv865; *Mystateusa, Inc* v. *Roam Secure, Inc et al*, U.S. District-Idaho (Southern) 1:09cv143 relating to this patent. This reexamination may not have resolved all questions raised by these decisions. See 37 CFR 1.552(c) for *ex parte* reexamination and 37 CFR 1.906(c) for *inter partes* reexamination.

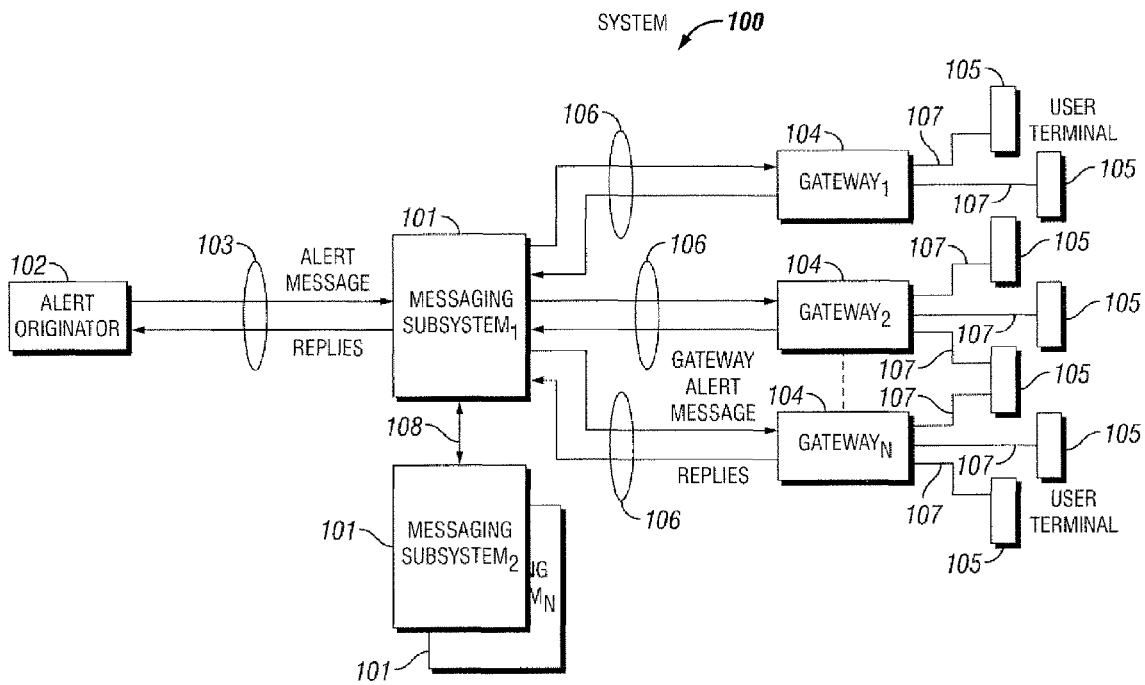

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 4, 6, 7 and 12-18 is confirmed.

Claims 1-3, 5 and 8-11 are cancelled.

\* \* \* \* \*